(12) United States Patent
Christmas et al.

(10) Patent No.: US 11,493,881 B2
(45) Date of Patent: Nov. 8, 2022

(54) HOLOGRAPHIC PROJECTOR

(71) Applicant: Dualitas Ltd, Knowlhill (GB)

(72) Inventors: Jamieson Christmas, Knowlhill (GB);
Máté Karner, Knowlhill (GB)

(73) Assignee: Dualitas Ltd, Milton Keynes (GB)

( * ) Notice: Subject to any disclaimer, the term of this patent is extended or adjusted under 35 U.S.C. 154(b) by 145 days.

(21) Appl. No.: 16/984,730

(22) Filed: Aug. 4, 2020

(65) Prior Publication Data

US 2021/0041834 A1 Feb. 11, 2021

(30) Foreign Application Priority Data

Aug. 5, 2019 (GB) ..................................... 1911164

(51) Int. Cl.
*G03H 1/22* (2006.01)
*G02B 5/32* (2006.01)
(Continued)

(52) U.S. Cl.
CPC ............. *G03H 1/2294* (2013.01); *G02B 5/32* (2013.01); *G02B 27/1006* (2013.01);
(Continued)

(58) Field of Classification Search
CPC .. G03H 1/2294; G03H 1/0408; G03H 1/2205; G03H 1/2286; G03H 2222/53; G03H 2223/18; G03H 2225/60; G03H 2001/0216; G03H 2001/2207; G03H 2001/2231; G03H 2222/18; G03H 2223/16; G03H 2225/52; G03H 2225/61; G03H 2227/02; G03H 1/02; G03H 1/22;
(Continued)

(56) References Cited

U.S. PATENT DOCUMENTS

2009/0109405 A1* 4/2009 Horikawa ............... G02B 27/46
348/E5.142
2010/0060618 A1 3/2010 Okuda et al.
(Continued)

FOREIGN PATENT DOCUMENTS

GB 2482864 A 2/2012
GB 2485609 A 5/2012
(Continued)

OTHER PUBLICATIONS

UKIPO Combined Search and Examination Report under Sections 17 & 18(3), GB Application No. 1911164.0, dated Feb. 3, 2020, 6 pages.

*Primary Examiner* — Jade R Chwasz
(74) *Attorney, Agent, or Firm* — McDonnell Boehnen Hulbert & Berghoff LLP

(57) ABSTRACT

A holographic projector having an optical path is described. The holographic projector comprises a first spatial light modulator arranged to display a first hologram, and a first light source. The first light source is arranged to illuminate the first spatial light modulator with light of a first wavelength such that a first holographic reconstruction corresponding to the first hologram is formed on a replay plane. The holographic projector further comprises a continuous block of transparent material. At least part of the optical path is formed through the continuous block of transparent material. The transparent material has a refractive index greater than air.

19 Claims, 11 Drawing Sheets

(51) Int. Cl.
*G02B 27/10* (2006.01)
*G03H 1/04* (2006.01)

(52) U.S. Cl.
CPC ......... *G03H 1/0408* (2013.01); *G03H 1/2205* (2013.01); *G03H 1/2286* (2013.01); *G03H 2222/53* (2013.01); *G03H 2223/18* (2013.01); *G03H 2225/60* (2013.01)

(58) Field of Classification Search
CPC .. G03H 2225/12; G02B 5/32; G02B 27/1006; G02B 27/0103; G02B 27/0172; G02B 2027/0174
USPC .......................................................... 359/11
See application file for complete search history.

(56) References Cited

U.S. PATENT DOCUMENTS

2018/0136383 A1\* 5/2018 Choi ..................... G03H 1/02
2018/0173057 A1\* 6/2018 Choi ..................... G03H 1/22

FOREIGN PATENT DOCUMENTS

| GB | 2555332 A | \* | 4/2018 | ............... G03H 1/02 |
| JP | 2003337298 A | | 11/2003 | |
| WO | 2002103458 A1 | | 12/2002 | |
| WO | 2017152710 A1 | | 9/2017 | |

\* cited by examiner

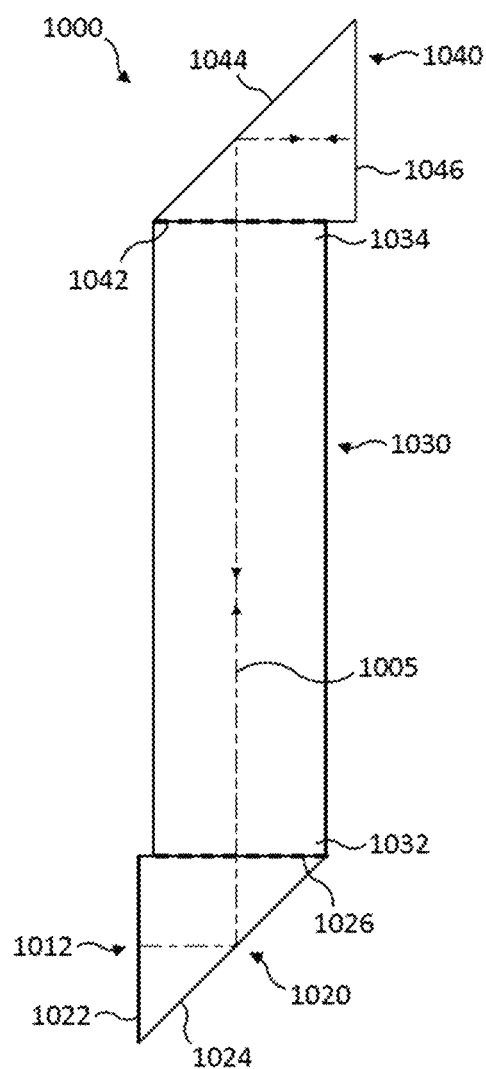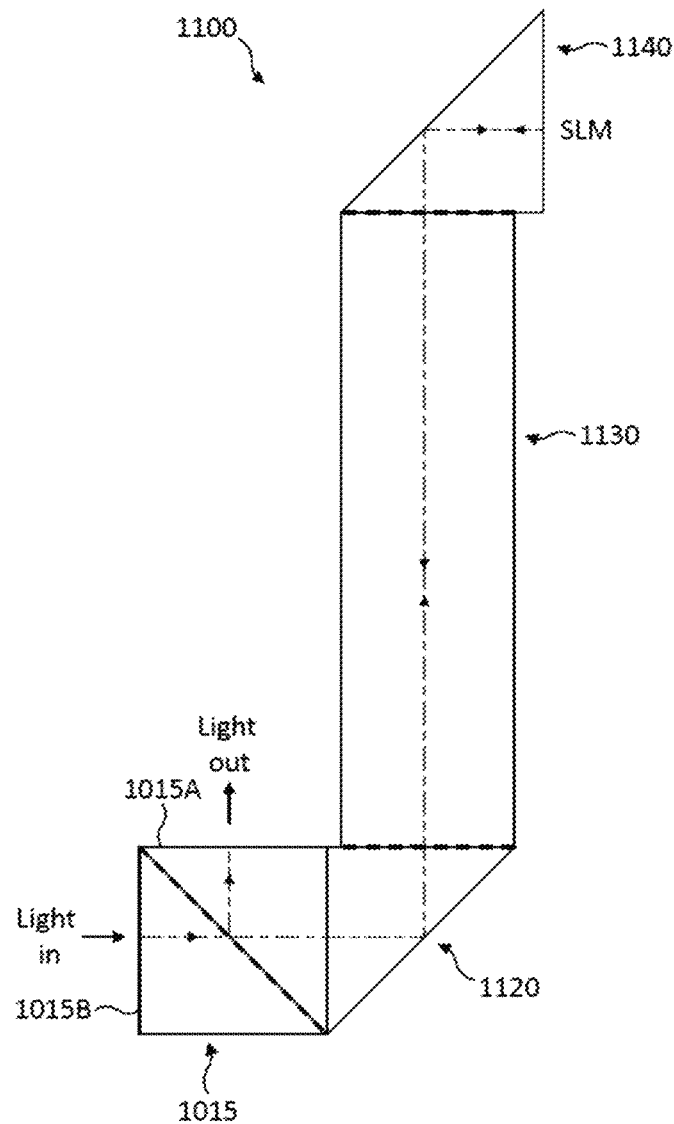
FIG. 10
FIG. 11

HOLOGRAPHIC PROJECTOR

CROSS-REFERENCE TO RELATED APPLICATIONS

This application claims the benefit of priority of United Kingdom Patent Application no. 1911164.0, filed Aug. 5, 2019, which is hereby incorporated herein by reference in its entirety.

FIELD

The present disclosure relates to a projector. More specifically, the present disclosure relates to a holographic projector and a holographic projection system. Some embodiments relate to a head-up display and a head-mounted display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A moving diffuser may be used to improve image quality in devices which use coherent light such as holographic projectors.

SUMMARY

Aspects of the present disclosure are defined in the appended independent claims.

There is disclosed herein a holographic projector having an optical path. The holographic projector comprises a first spatial light modulator, a first light source and a continuous block of transparent material. The first spatial light modulator is arranged to display a first hologram. The first light source is arranged to illuminate the first spatial light modulator with light of a first wavelength such that a first holographic reconstruction corresponding to the first hologram is formed on a replay plane. The continuous block of transparent material forms at least part of the optical path of the holographic projector. The transparent material has a refractive index greater than air.

The continuous block of transparent material comprises: at least one parallelepiped block of the transparent material arranged such that light of the projector travels longitudinally through the parallelepiped block (without total internal reflection from the sides thereof), and at least one prism arranged such that light of the projector travels through the prism with one total internal reflection. Thus, light travels in a straight line (i.e. without changing direction owing to reflection) through the parallelepiped block from a first end to a second end thereof, and is redirected by the prism by one total internal reflection. Thus, light of the projector propagates entirely within the transparent material.

The transparent material has a refractive index greater than one at a wavelength of the holographic projector. More specifically, the transparent material has a refractive index greater than one at the wavelength of the light emitted by the light source.

The word "block" is used herein to define that the transparent material is a transparent solid material that occupies a volume in space. The holographic projector of the present disclosure is formed of a solid block of transparent material such as glass. This provides two significant technical advantages: firstly, improved mechanical and thermal stability; and secondly, improved optical efficiency without compromising volume.

The expression "light of the projector" includes light from the light source that travels along the illumination path and illuminates a spatial light modulator, which corresponds to light of an "input light beam" described herein. In addition, the "light of the projector" includes spatially modulated light from a spatial light modulator that travels along the projection path to the replay plane, which corresponds to light of the "output light beam" described herein.

The optical path of the holographic projector comprises the illumination path from light source to spatial light modulator. The optical path of the holographic projector also comprises the projection path from spatial light modulator to replay plane. At least part of the optical path of the holographic projector is formed through the continuous block. That is, the optical path is a light path through the transparent material. The continuous block of transparent material therefore forms and/or defines at least part of the optical path of the holographic projector. The optical path extends longitudinally through the at least one parallelepiped block. Thus, light propagates in a straight line through the parallelepiped block. The optical path is redirected by the at least one prism. In particular a prism redirects the light by total internal reflection by a single surface of the prism. The configuration of the continuous block may determine the length and route (including the direction) of the optical path from the first end to the second end thereof. Thus, the configuration of the continuous block dictates the at least part of the optical path formed therethrough. Significantly, light propagates longitudinally along the optical path through a parallelepiped block of the continuous block without total internal reflection from the sides of the parallelepiped block, and light propagates through a prism of the continuous block with only a single total internal reflection that changes the direction of the optical path.

The block of transparent material in accordance with this disclosure is robust and provides improved resilience to mechanical vibration and movement. For example, the projector can be mechanically fixed to other components such as other components of a larger system that houses the projector. This is particularly significant in applications such as head-up display in a vehicle. Fewer individual parts and fewer different materials are used. For example, in a conventional projector, a glass mirror may be supported in a plastic mirror mount with metal screw adjustments. The use of one material to form the bulk of the structure, notably including the reflective elements, improves thermal stability because the bulk of the structure expands and contracts as one. That is, stresses and strains between materials having different thermal coefficients of expansion are largely avoided.

The continuous block may comprise a plurality of optical ports. An optical port is a surface arranged to receive light into the continuous block and/or output light from the continuous block. There are therefore input ports arranged to couple light into the continuous block and output optical ports arranged to couple light out of the continuous block. Each optical port may function as an input port, an output port or both.

In embodiments, the continuous block comprises an optical port arranged to be coupled to the spatial light modulator. The optical port of the continuous block may also comprise an input port arranged to be coupled to a light source and/or an output port arranged to be coupled to a replay plane. The optical port arranged to be coupled to the spatial light modulator couples light out of the continuous block to the spatial light modulator and/or couples light from the spatial light modulator into the continuous block. One or more of the optical ports may be configured as a prism.

The at least one prism of the continuous block comprises a surface arranged to reflect light travelling through the prism by total internal reflection so as to change the direction of the light travelling along the optical path. Thus, the at least one surface "turns" (i.e. rotates) the optical path of the holographic projector. In particular, the total internal reflection (TIR) surface of a prism changes the direction of the optical path, and thus determines the route of the optical path through the continuous block.

It is common to fold optical paths to decrease physical volume. However, folding an optical path requires reflections which involve some loss of light even if dielectric coatings are used. In some applications, such as head-up display, there is a pressing need to minimize volume and maximize light efficiency. Notably, the holographic projector in accordance with this disclosure is formed in a solid material, such as glass, so that the laws of total internal reflection can be obeyed in order to provide lossless reflections. Therefore, any number of reflections may be used as required to minimize volume and therefore increase design options. For example, greater design freedom is provided if optical losses caused by mirrors do not need to be considered. Again, this is significantly advantageous in applications such as head-up display where there is a demand to minimize the number of reflections because of the detrimental effect to contrast ratio. Notably, the solid block in accordance with this disclosure may comprise at least one surface—such as a machined surface—which provides total internal reflection. That is, the critical angle is exceeded at each reflection of light from one of these surfaces. The critical angle between air and glass is approximately 41 degrees and the angle of incidence may be approximately 45 degrees on each of the at least one surfaces.

Each surface providing total internal reflection may be a surface of a respective prism. Each respective prism is formed of the transparent material. At least one reflective surface is an interface between the transparent material and air.

The continuous block in accordance with this disclosure may conveniently be formed by seamlessly connecting a plurality of blocks of the transparent material. Seamless connections may be formed by abutting polished surfaces and, optionally, using refractive index matching fluid. The connections are seamless in an optical sense. That is, the interface at each seamless connection does not affect light traversing the interface. For example, a first block of the transparent material may be adjoined to a second block of the transparent material. The first block may be a prism and the second block may be a parallelepiped. In this example, adjoining of a prism to a parallelepiped provides a surface which turns the optical path of light from the parallelepiped. The entire continuous block of transparent material may comprise a plurality of parallelepiped blocks of the transparent material and/or a plurality of prisms of the transparent material seamlessly connected as described above. The use of plural blocks of the transparent material provides a modular-type system that is relatively each to construct using readily available components. Significant design flexibility is therefore provided. This is particularly important in applications such as head-up display for a vehicle wherein the configuration of the optical relay system, which relays a picture from a picture generating unit, is customized to the host vehicle.

Alternatively, each surface may be a machined surface of the continuous block of transparent material. For example, each surface may be a flat surface formed by machining—such as cutting or polishing—a section of the solid block. The flat surface may be inclined at an angle of 45 degrees to the axis of the optical path. The skilled artesian will understand that each surface may require polishing and/or refractive index matching fluid. Each surface of a prism of the continuous block that is arranged to redirect light is a transverse or end surface of the continuous block (i.e. providing an interface with air) or one of a plurality of blocks forming a part of the continuous block (i.e. providing a reflective surface or mirror within the continuous block). Since light propagates longitudinally along the optical path through the continuous block, each transverse or end surface redirects the light by total internal reflection, to change the direction or route of the optical path.

The at least part of the optical path formed of the continuous block of transparent material (having a refractive index greater than air) may be at least 25% of the length of the optical path of the holographic projector such as at least 50% or at least 75%. In embodiments, at least 25% of the length of the projection path of the holographic projector is formed through the continuous block, such as at least 50% or at least 75%. As described herein, the projection path of the holographic projector is the optical path between SLM and replay plane.

It may be understood that each prism surface arranged to redirect light of the holographic projector by total internal reflection improves light efficiency and provides a mechanically and thermally stable block as described above. Whilst it may be preferable that the entire optical path of the projector is formed through the continuous block, it is still advantageous if only a part of the optical path is provided in the transparent material. In fact, in some embodiments, it is advantageous if part of the optical path—in particular, although not exclusively, a part of the projection path—is in a block of the transparent material and part of the optical path is in free space. For example, the total length of the required projection path may be reduced by providing some of the optical path in air because diffraction angle is inversely related to refractive index. The diffraction angle of the light diffracted by the pixels of the spatial light modulator determines the geometric length of the projection path between the spatial light modulator and the replay plane required to achieve a desired replay field size. A large diffraction angle is generally desirable, but this is reduced by the continuous block since the refractive index of the transparent material is greater than air. Thus, whilst a part of the projection path is formed through the continuous block, a part of the projection path may be in free space to provide the required replay field size. The fraction of optical path provided in the transparent material is a design variable and trade-off which may be chosen based on the specification of the holographic projector.

The holographic projector may be a double pass optical system. That is, light of the projector may traverse the continuous block twice. A first pass comprises light of the first light source travelling from the first light source to the first spatial light modulator. A second pass comprises spatially modulated light travelling from the first spatial light modulator to the replay plane to form the first holographic reconstruction. The first pass and second pass may be substantially colinear. Light on the first pass may travel in the opposite direction to light on the second pass. The continuous block may therefore function as a double pass optical system which transmits light of the light source in a first direction and transmits spatially-modulated light from the spatial light modulator in a second direction, wherein the second direction is opposite to the first direction. A compact structure is provided by configuring the continuous block as a double pass system.

The first pass is characterised by an optical axis from an optical port coupled to the light source (i.e. input port) to an optical port coupled to the spatial light modulator. The second pass is characterised by a projection axis from the optical port coupled to the spatial light modulator to an optical port coupled to the replay plane (i.e. output port). In some embodiments, the projector is configured such that the spatial light modulator is illuminated by diverging light from the light source. In these embodiments, light on the first pass is diverging light. In alternative embodiments, the projector is configured such that the spatial light modulator is illuminated by collimated light from the light source. In these embodiments, light on the first pass may be collimated light or the light on the first pass may be diverging and a collimating optic, such as a lens positioned for collimation, is added at the optical port coupled to the spatial light modulator. Light on the second pass is diffracted light characterised by a projection axis and angle of diffraction. In some embodiments, the optical axis of the first pass (illumination path) and the projection axis of the second pass (projection path) are substantially colinear but opposite in propagation direction.

The continuous block may comprise a first optical port coupled to the first spatial light modulator. The first spatial light modulator may abut the first optical port. Optical alignment of the spatial light modulator is crucial for forming a good quality holographic reconstruction. Each optical port may comprise a surface machined to high precision because the surface is formed of a solid block of, for example, glass which may be accurately machined and polished. The optical ports of the block therefore provide an excellent surface onto which the spatial light modulator can be mounted. The usual problems of mounting and, in particular, optically aligning the spatial light modulator are therefore addressed.

The first optical port may comprise a shaped surface arranged to provide optical power such that the light incident upon the spatial light modulator is collimated. It can be advantageous for light on the first pass to be diverging. However, it can be preferable to illuminate the spatial light modulator with collimated light. In some embodiments, the first optical port coupled to the first spatial light modulator is shaped—e.g. curved—to provide optical power/lensing. The skilled artesian will understand how the optical power provided by the shaped surface of this optical port may be determined based on the angle of divergence of the light on the first pass.

The holographic projector may further comprise a second spatial light modulator and a second light source. The second spatial light modulator may be arranged to display a second hologram. The second light source may be arranged to illuminate the second spatial light modulator with light of a second wavelength such that a second holographic reconstruction corresponding to the second hologram is formed on the replay plane. The continuous block may comprise a second optical port coupled to the second spatial light modulator. The second optical port may be coplanar with the first optical port. The second spatial light modulator may abut the second optical port. The second optical port may comprise a shaped surface arranged to provide optical power, as described above in relation the first optical port.

The holographic projector may comprise a plurality of single colour channels, wherein each colour channel comprises a light source and a respective spatial light modulator. The single colour channels may be arranged on a common axis such that the corresponding plurality of single colour holographic reconstructions are coincident on the replay plane. However, the lengths of the single colour channels are different to compensate for the dependence of replay field size on wavelength, as described in European patent 3,268,816. Specifically, the lengths of the single colour channels are individually determined such that the size of each replay field on the replay plane is the same. The continuous block may therefore comprise a plurality of staggered coplanar optical ports arranged on a surface of the continuous block, each coupled to a respective spatial light modulator. Such a configuration may be accurately formed in a continuous block of transparent material. The continuous block in accordance with this disclosure is therefore highly compatible with this preferred solution to the problem of replay field size.

The continuous block may comprise a first beam-splitting cube. The beam-splitting cube may have a first surface, second surface and third surface. The first surface is arranged to receive spatially-modulated light from the first spatial light modulator. The second surface forms the second optical port. The third surface is arranged to receive light from the first and second light sources.

Examples disclosed in European patent 3,268,816 use dichroic elements. These may be readily implemented in the continuous block of the present disclosure using a pair of prisms arranged to form a beam-splitting cube. The two prisms may form a cube by abutting their bases. The base of at least one of the prisms may comprise a dielectric layer which may, for example, have been applied by coating. It may be said that the beam-splitting cube comprises an internal interface having a dielectric layer. The dielectric layer is a dichroic arranged to provide the functionality described in European patent 3,268,816. The dichroic layer may be transmissive at the first wavelength and reflective at a second wavelength. The necessary dichroic element or elements may therefore be integrated into the glass block structure with simplicity but high precision, and without introducing additional materials which may have different coefficients of thermal expansion.

The continuous block may comprise a turning portion having two surfaces collectively arranged to reflect light of the holographic projector through 180 degrees, by total internal reflection. A folded optical path comprising two parallel portions is formed, each portion either side of the turning portion. In some applications, there is a desire to minimize volume and therefore fold the optical path. The inventors recognized the ease at which optical folds may be formed in the continuous block by using pairs of abutted prisms. The internal interface of each prism forms a surface for total internal reflection, which turns the optical path through 90 degrees. The continuous block in accordance with the present disclosure is therefore particularly effective for increasing optical path length whilst minimizing the resultant increase in physical volume and light loss.

The continuous block may comprise an input/output (I/O) beam-splitting cube. The I/O beam-splitting cube has a first face forming an input optical port coupled to the first light source. The I/O beam-splitting cube has a second face forming an output optical port arranged to output spatially-modulated light forming the first holographic reconstruction.

The term "input beam" may be used to refer to light before spatial modulation by the spatial light modulator and the term "output beam" may be used to refer to the light after spatial modulation by the spatial light modulator.

The I/O beam-splitting cube separates the input beam from the output beam. The input beam is the beam from the light source. The output beam is the beam of spatially-modulated light which forms the holographic reconstruction on the replay plane. The projector may comprise a plurality of single colour channels and, in these cases, the second beam-splitting cube separates each input beam from the corresponding output beam. The I/O beam splitting cube has an internal interface that effectively functions as a one-way mirror to separate the input beam from the output beam.

The internal interface of the I/O beam-splitting cube may comprise a pinhole aperture. The light from each light source may be diverging. The pinhole aperture is arranged to transmit diverging light of the first light source. However, the output beam is a diffracted beam having an angle of diffraction. Therefore, the internal interface of the I/O beam-splitting cube functions as a surface for total internal reflection because only a very small part of the output beam is removed, by transmission through the pinhole aperture. In fact, the pinhole aperture may remove the so-called DC (zero-order or undiffracted light) spot from the holographic replay field. This improves the signal to noise ratio of the holographic reconstruction because the DC spot is not image content but noise (since it is formed from specularly reflected light that is not diffracted by the spatial light modulator). The I/O beam-splitting cube is therefore a simple means for separating the input and output beams, and optionally removing noise, without introducing optical losses associated with the image content.

The transparent material may have a refractive index greater than 1.4. The transparent material may be glass or fused silica. The refractive index of the block is greater than that of air which means that total internal reflection can be achieved by exceeding the critical angle.

The holographic projector may be incorporated in a picture generating unit and/or head-up display for a vehicle.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

The term "seamless connection" is used herein to refer to a connection between two blocks of solid transparent material, such as prisms, beam-splitting cubes and parallelepipeds that is, at least, optically seamless. In some embodiments, a seamless connection may also provide a mechanical connection between two blocks for form the continuous block. The term "medial" refers to a central longitudinal (as opposed to lateral) line between two ends of a block of transparent material.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIG. 10 is a schematic plan view of a continuous block of transparent material in accordance with yet another embodiment;

FIG. 11 is a schematic plan view of continuous block of transparent material in accordance with still another embodiment.

The same or similar reference numbers will be used throughout the drawings to refer to the same or similar parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or such like—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
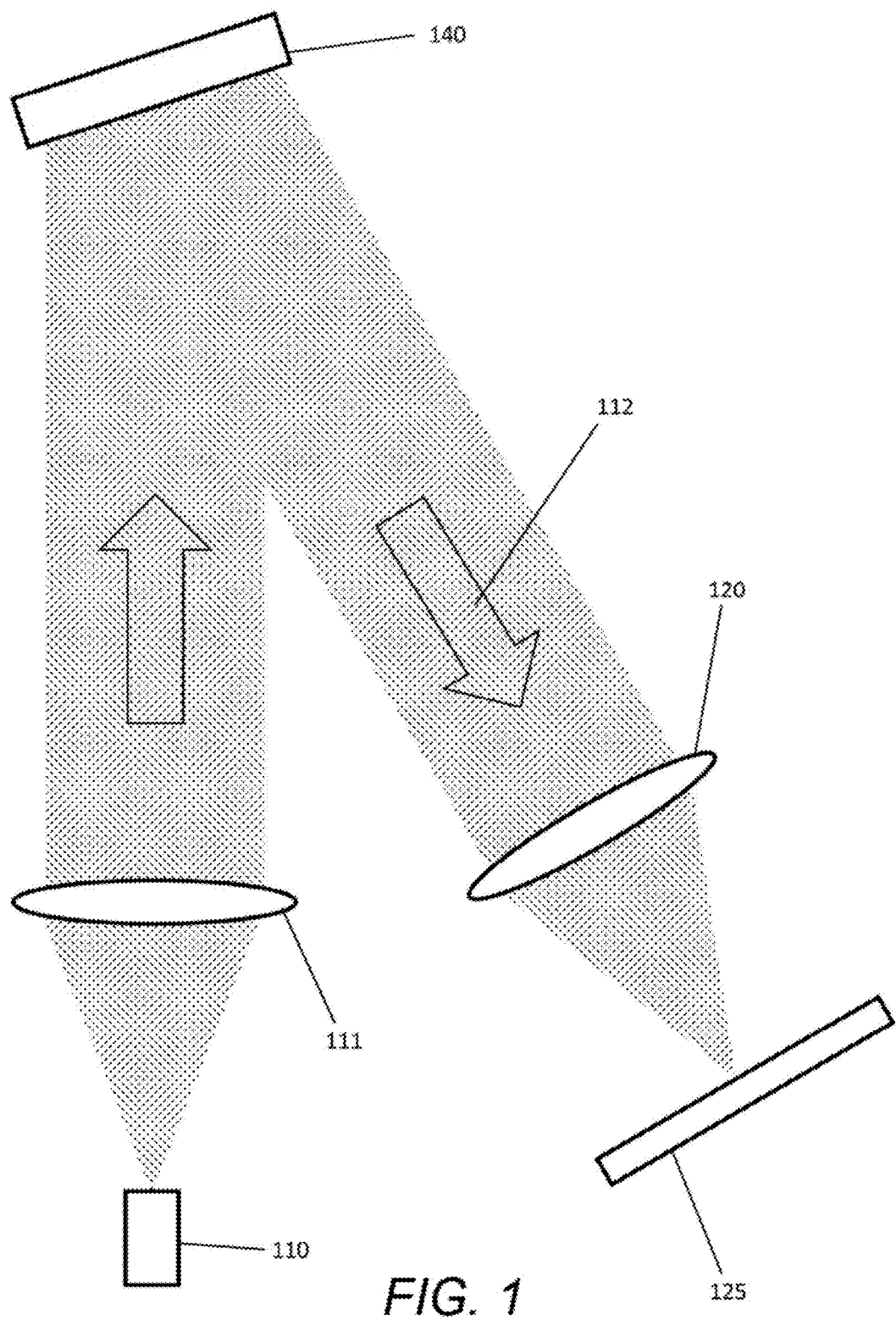
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

The embodiment of FIG. 1 may be implemented in a holographic projector comprising light source 110, collimating lens 111, SLM 140, Fourier transform lens 120 and screen 125 having a defined optical path. In particular, an optical path is defined in space between light source 110, SLM 140 and screen 125, along which light propagates through the holographic projector. Light of the holographic projector comprises light travelling from light source 110 to SLM 140, and spatially modulated light travelling from SLM 140 to screen 125. The optical path between light source 110 and SLM 140 through collimating lens 111 may be called the "input optical path" or "illumination path" and the optical path between SLM 140 and screen 125 through Fourier transform lens 120 may be called the "output optical path" or "projection path". The light of the holographic projector propagates along the optical path as a narrow light beam (e.g. diameter of about 0.25 centimetres to about 3 centimetres). In some embodiments, light source 110 and/or screen 125 may be external to the holographic projector.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, IA(x, y) and IB(x, y), in the planes A and B respectively, are known and IA(x, y) and IB(x, y) are related by a single Fourier transform. With the given intensity cross-sections, an approximation to the phase distribution in the planes A and B, $\Psi A(x, y)$ and $\Psi B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of IA(x, y) and IB(x, y), between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\Psi[u, v]$ of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\Psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
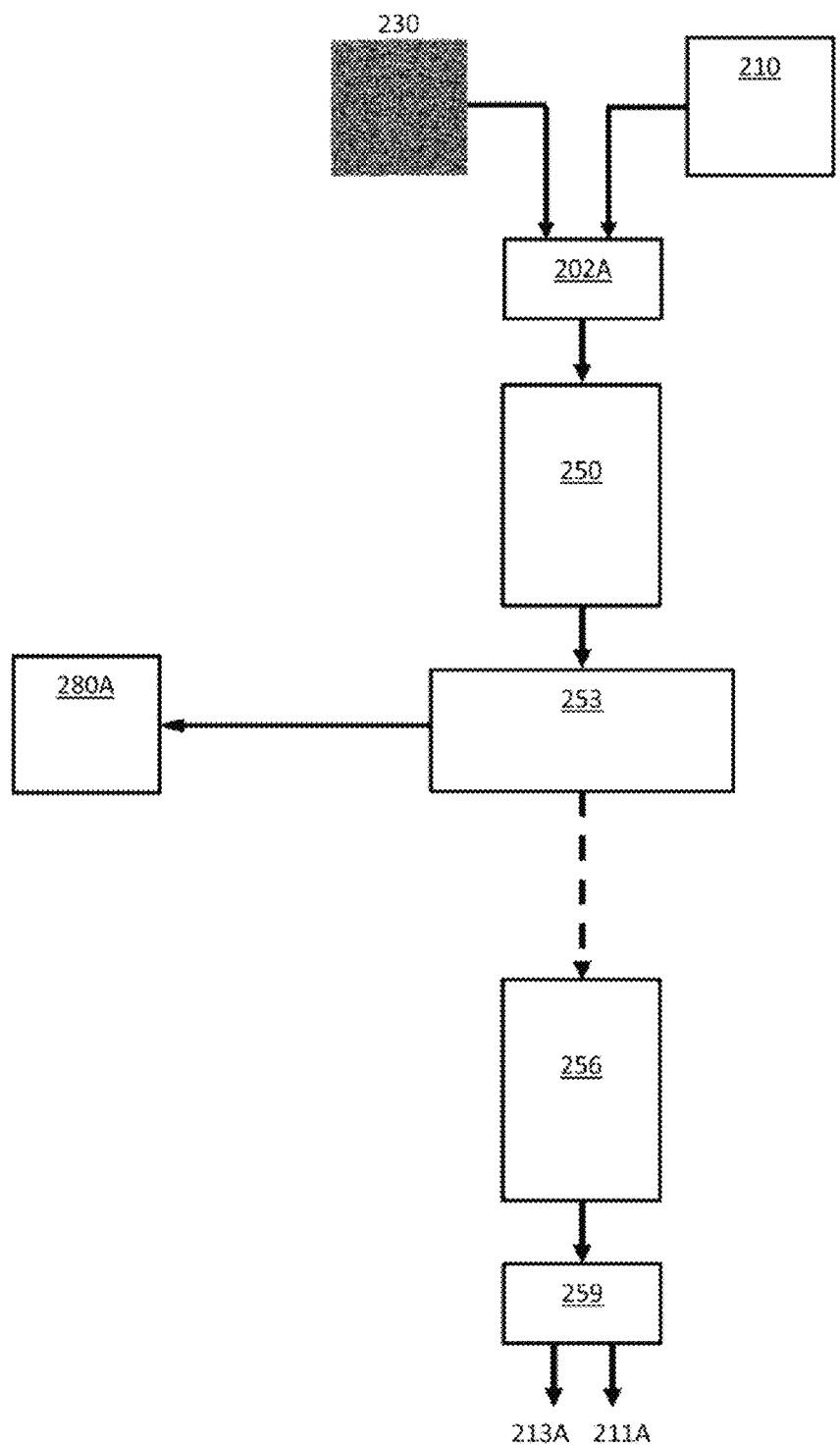
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
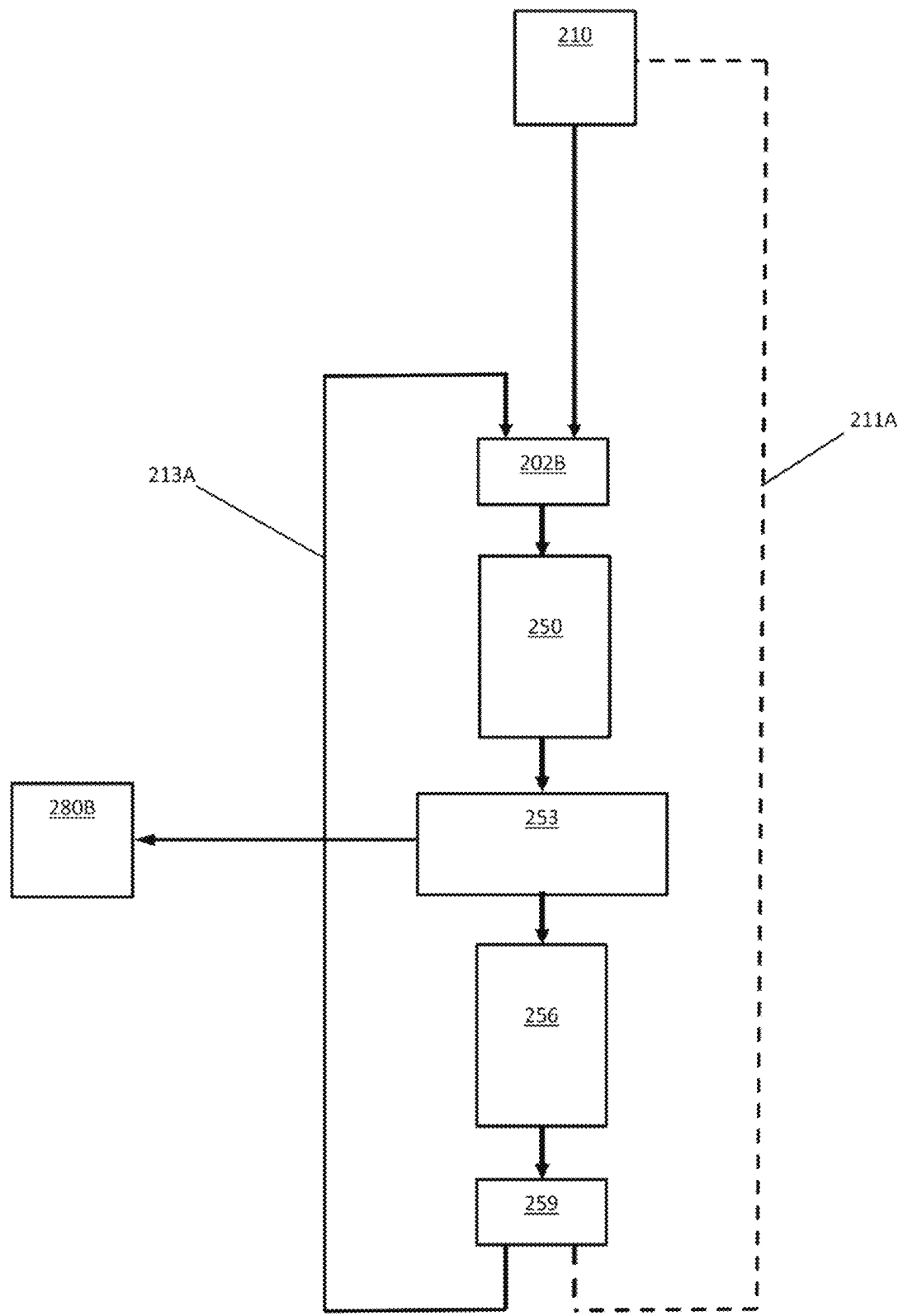
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
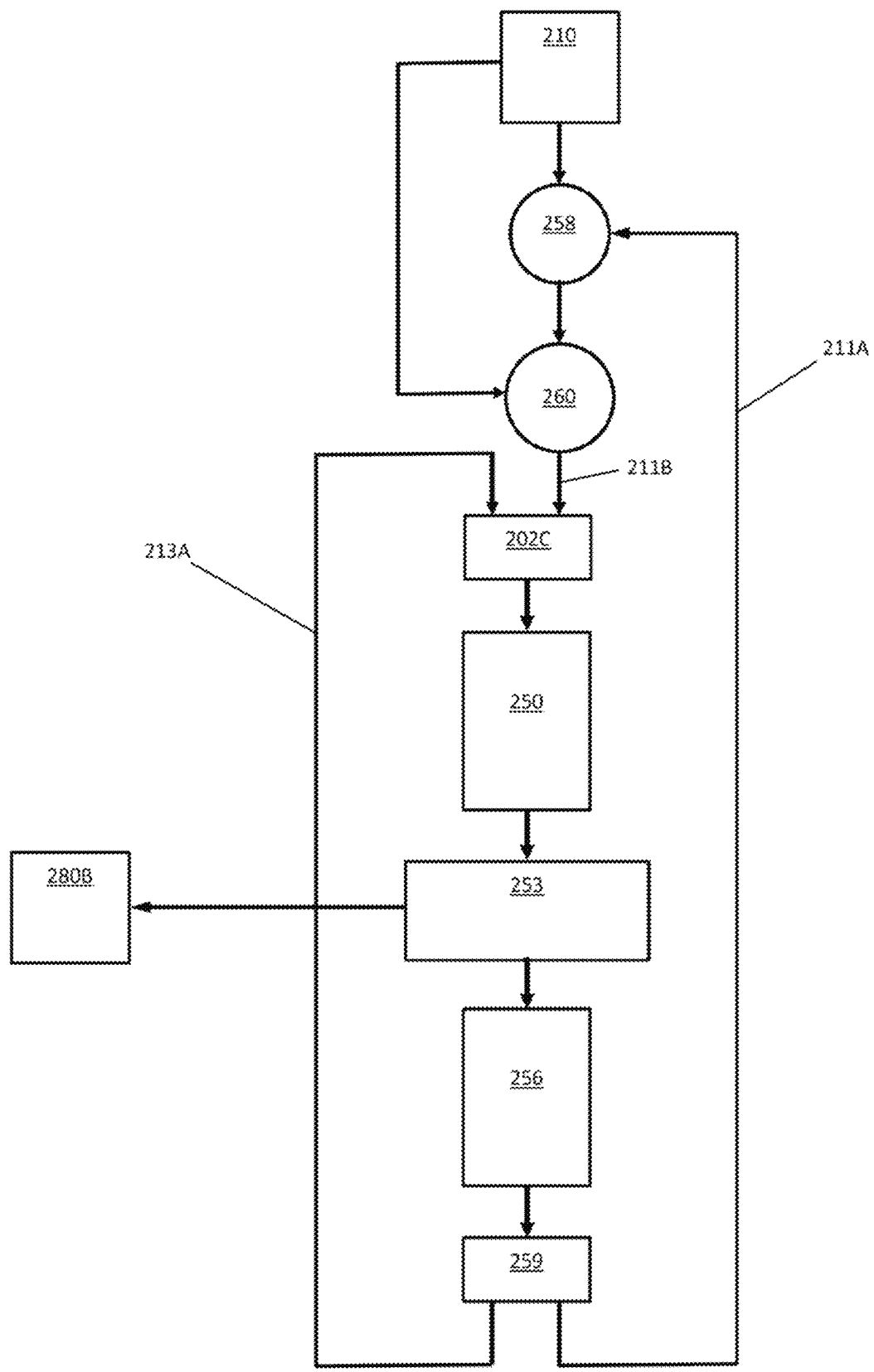
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x, y] = F'\{\exp(i\Psi_n[u, v])\}$$

$$\Psi_n[u,v] = \angle F\{\eta \cdot \exp(i\angle R_n[x,y])\}$$

$$\eta = T[x,y] - \alpha(|R_n[x,y]| - T[x,y])$$

where:
F' is the inverse Fourier transform;
F is the forward Fourier transform;
R[x, y] is the complex data set output by the third processing block 256;
T[x, y] is the input or target image;
∠ is the phase component;
Ψ is the phase-only hologram 280B;
η the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram Ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Optical Path

Figure 3:
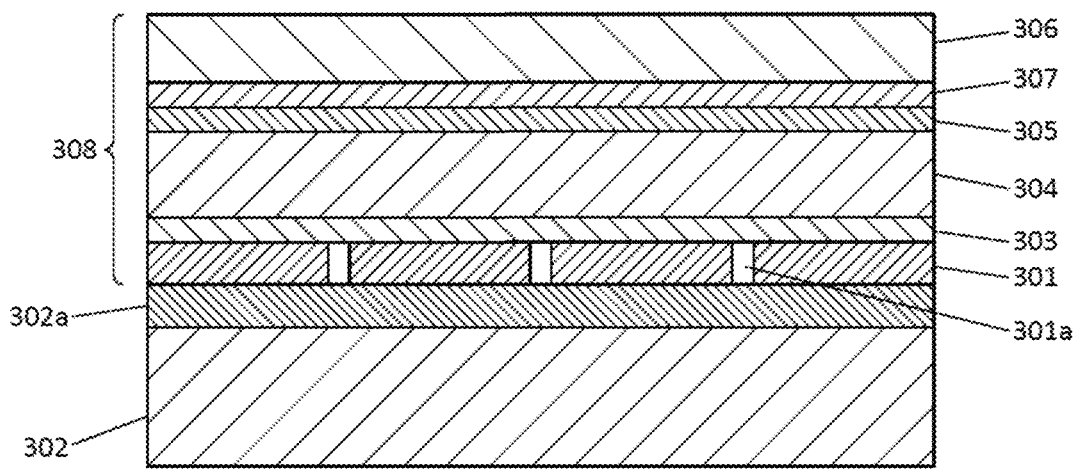
FIG. 3 is a schematic of a reflective LCOS SLM.

As described above with reference to FIG. 1, a holographic projector may be implemented using an addressable spatial light modulator, such as the LCOS SLM of FIG. 3. An input light beam from a light source, such as a laser diode, propagates along an illumination path corresponding to a first portion of an optical path of the holographic projector and is incident on the SLM. An output light beam comprising spatially modulated light from the SLM propagates along a projection path corresponding to a second portion of the optical path of the holographic projector for forming a holographic reconstruction at a replay plane. The holographic reconstruction corresponds to the hologram written to, and thus displayed on, the SLM.

The geometric length of the optical path is dependent upon design requirements. Typically, the optical path of the input light beam (illumination path) is folded back onto the optical path of the output light beam (projection path). This is achieved by using a near-normal angle of incidence on the SLM as shown in FIG. 1, or using a normal angle of incidence on the SLM and separating the input and output light beams using a beam splitter. Folding the optical path enables a reduction the geometric size of the holographic projector, providing a compact design.

Conventionally, the optical path is formed through air within an enclosure (e.g. housing) of the holographic projector, and the components of the projector are spatially arranged within the enclosure (e.g. mounted to the housing) along the optical path. However, such an arrangement suffers from a number of drawbacks. First, the components of the projector are susceptible to mechanical vibration and movement within the enclosure, which may occur when the holographic projector is used in mobile applications. In particular, since each component is mounted or otherwise arranged independently, each component moves independently of other components in response to external mechanical vibration and movement. This may lead to relative movement between components and, in consequence, misalignment between components. Even small misalignments between optical components can significantly degrade image quality. In addition, the components and/or mechanical fixings, used to mount the components within the enclosure, may be formed of different materials having different thermal coefficients of expansion. Thus, different components may respond differently to a particular thermal change due to differences in their material and/or the material of their fixings. In consequence, in applications where the holographic projector is required to operate in different thermal environments, the different materials associated with components within the housing may expand and contract by different amounts in response to thermal changes. This may also lead to relative movement and misalignment between optical components, which can degrade image quality.

In accordance with the present disclosure, at least part of the optical path of the holographic projector is formed through a transparent solid material, such as glass. The use of a transparent solid material as a medium for the propagation of light along a defined optical path provides a more stable arrangement, which is more robust and resilient to mechanical vibration and movements. In particular, components of the holographic projector may be fixed to the transparent solid material, so that the components move together in response to external mechanical vibrations and movement. Thus, the problems of relative movement and misalignment between optical components are overcome, thereby preserving good image quality. In addition, at least some components of the holographic projector may be formed integrally with the transparent solid material. Thus, the holographic projector may be formed from fewer different materials, making the response to thermal changes more uniform or consistent. However, the use of a transparent solid material as a medium for the propagation of light has a number of inherent difficulties. First, when light propagates through a transparent solid material such as glass, optical losses may increase (e.g. from absorption or scattering) in the solid material. This can lead to a reduction in the intensity of the holographic reconstruction, and so adversely affect contrast ratio of the image. In addition, propagation of spatially modulated light from the SLM to the replay plane through a transparent solid material such as glass reduces the diffraction angle, therefore increasing the geometric distance required from the SLM to the replay plane to achieve a desired replay field size. This leads to a less compact design. The embodiments described herein overcome at least some of these inherent difficulties.

First Embodiment

Figure 4:
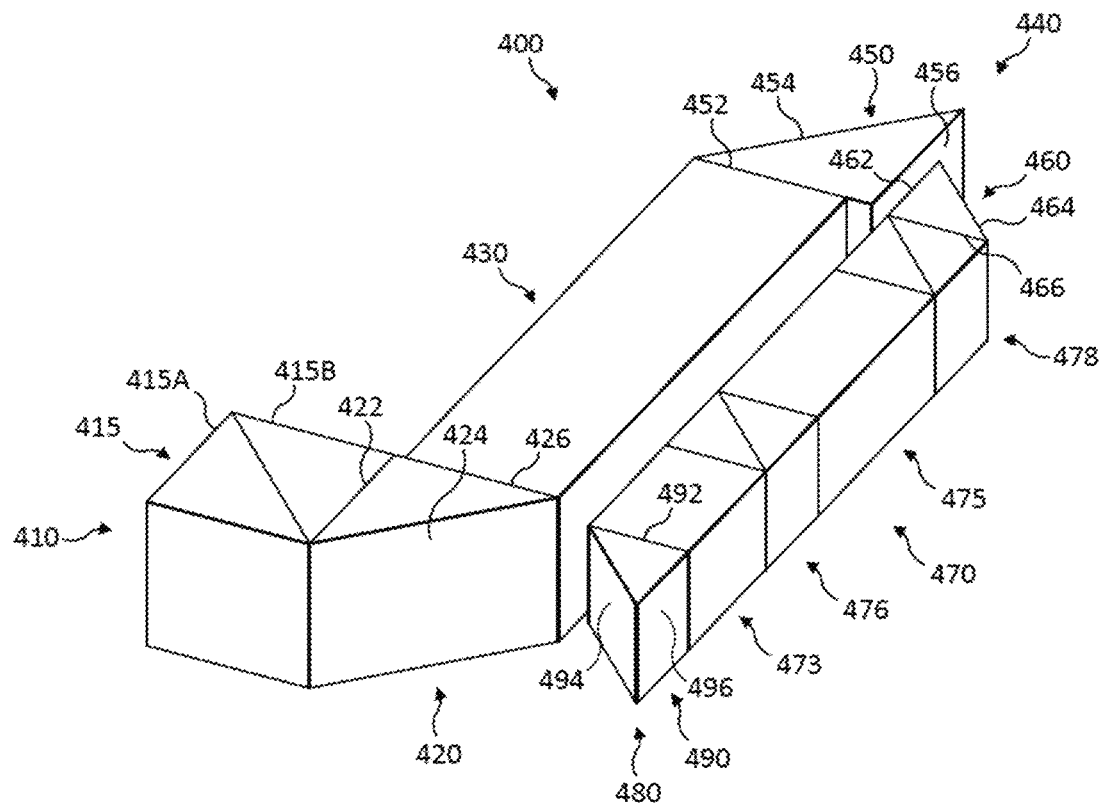
FIG. 4 is a perspective view of a continuous block of transparent material for forming an optical path of a holographic projector in accordance with an embodiment.
Figure 5:
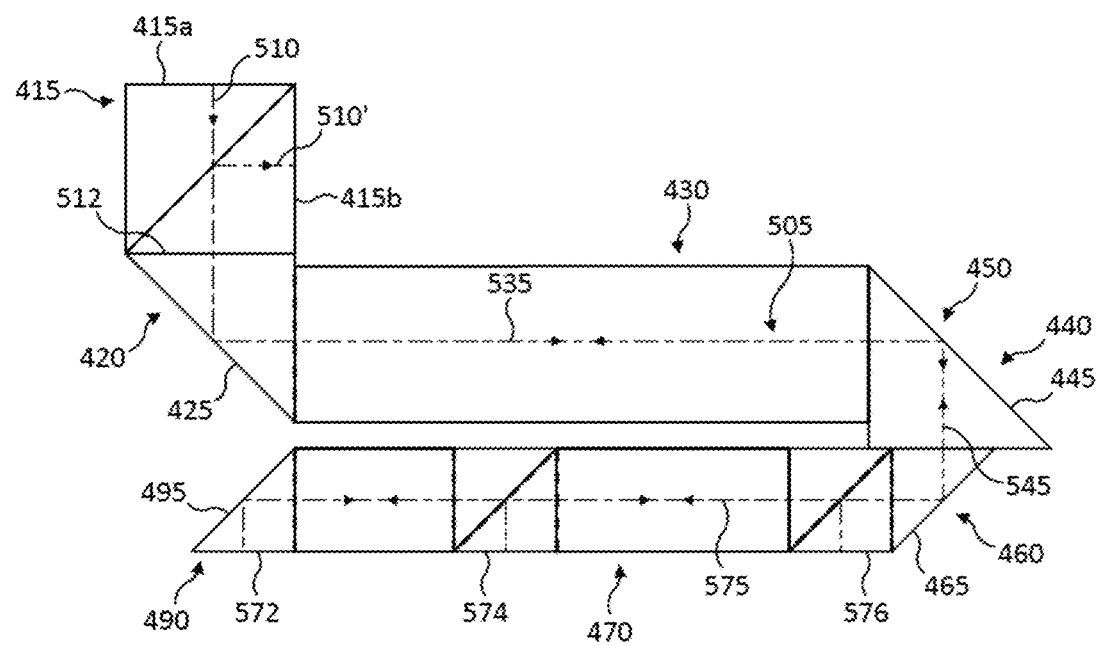
FIG. 5 is a schematic plan view of the continuous block of transparent material of FIG. 4.
Figure 6:
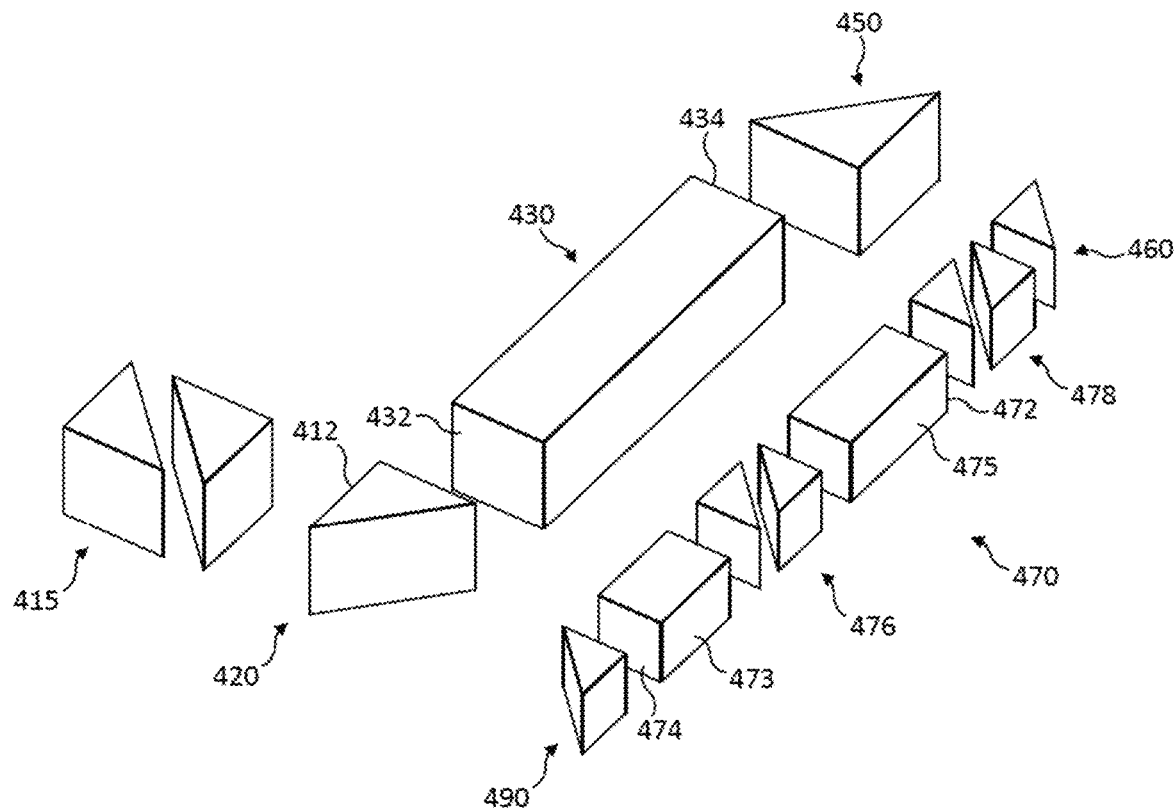
FIG. 6 is an exploded perspective view of the continuous block of transparent material of FIG. 4.

FIGS. 4 to 6 show views of a continuous block of transparent material 400 arranged to form (or provide) at least part of an optical path 505 of a holographic projector in accordance with a first embodiment.

In particular, continuous block 400 has a first end 410, a first rectangular portion 430, a turning portion 440, a second rectangular portion 470 and a second end 480. First rectangular portion 430, turning portion 440 and second rectangular portion 470 are optically (and optionally mechanically) connected in a seamless manner, as described further below, and are formed from the same transparent solid material. Thus, a continuous block 400 is provided for the propagation of light along an optical path 505 of the holographic projector. Optical path 505 extends longitudinally through the length of the continuous block 400. Accordingly, light of the holographic projector travels directly through the transparent solid material, without internal reflection from the sidewalls thereof. The route of the optical path 505 is defined by the configuration of the continuous block, as described below.

The transparent material of the continuous block 400 may have a refractive index greater than 1.4. The transparent material may be glass or fused silica. The refractive index of the block is greater than that of air which means that total internal reflection can be achieved by exceeding the critical angle, as described below.

First end 410 of continuous block 400 comprises a first prism 420. A first face 422 of first prism 420 forms an input/output (I/O) optical port 412 on a first side of the continuous block 400. I/O optical port 412 couples light 510 from at least one light source (not shown) into block 400, and, in some arrangements, couples spatially modulated light 510' out of block 400. A second face 424 of first prism 420 forms a first total internal reflection (TIR) surface 425 for redirecting light from the I/O optical port 412 formed by the first face 422 onto a third face 426. Third face 426 of first prism 420 is seamlessly connected optically to a first end 432 of a first rectangular portion 430 forming a first section 535 of an optical path 505 (see FIG. 5).

First TIR surface 425 comprises a machined or polished surface of the transparent material of the first prism 420. In particular, TIR surface 425 is an interface between the transparent material of the prism 420 and air. Thus, light incident on TIR surface 425 at an angle of incidence greater than or equal to the critical angle (for the transparent material to air interface) is internally reflected within the first prism 420, by total internal reflection, as shown in FIG. 5. Thus, there is no loss of optical energy at TIR surface 425. In the illustrated example, light passes normally through the first face 422 of first prism 420, is incident on second face 424 at 45 degrees and so it reflected by TIR surface 425 at an angle of reflection of 45 degrees, and is incident normally (i.e. at 90 degrees) on the third face 426 of first prism 420. It may be said that TIR surface 425 "turns" the direction or route of the input light through 90 degrees.

Third face 426 of first prism 420 is optically connected to the first end 432 of first rectangular portion 430 in a seamless manner, so as to form the continuous block of transparent material 400. Seamless optical connection may be provided using any suitable technique. For example, a seamless connection may be provided by abutting highly polished surfaces and/or by joining using a refractive index matching fluid or gel. Since light is incident normally on third face 426 of first prism, it propagates seamlessly into the first rectangular portion 430 (i.e. without deviation). Thus, as shown in FIG. 5, an input light beam 510 coupled into the block 400 via first prism 420 is directed by first TIR surface 425 onto a first section 535 of optical path 505.

First rectangular portion 430 comprises a rectangular block (e.g. parallelepiped) of solid transparent material having a first end 432 and a second end 434. First and second ends 432, 434 of first rectangular portion 430 are square in shape (i.e. block 430 has a square cross section) and sides that are rectangular or oblong in shape. The length of the first rectangular portion 430 is longer than its width and corresponds to the geometric length of the first section 535 of the optical path 505. It may be said that the first section 535 of optical path 505 extends longitudinally through the first rectangular portion 430 (i.e. along the "longitudinal axis" thereof).

Second end 434 of first rectangular portion 430 is seamlessly connected to a turning portion 440 of the block 400, which serves to turn the optical path through 180 degrees. It may be said that turning portion 440 reflects light through 180 degrees. Turning portion 440 comprises a second prism 450 in abutment with a third prism 460.

In particular, second end 434 of first rectangular portion 430 is seamlessly optically connected to a first face 452 of second prism 450, similar to the seamless connection between first end 432 of rectangular portion 430 and third face 426 of first prism 420. A second face 454 of second prism 450 forms a second TIR surface 445 for redirecting light from the rectangular block 430 to a third face 456 of second prism 450, which abuts a first face 462 of third prism 460. In particular, third face 456 of second prism 450 is seamlessly connected to first face 462 of third prism 460. Thus, the passage of light through the second prism 450 may be similar to the passage of light through the first prism 420, with light incident normally on the first face 452 and third face 456, and with light incident on second face 454 at 45 degrees. The second prism 450 therefore turns the optical path 505 through 90 degrees onto a second section 545 of optical path 505. Second section 545 of the optical path 505 extends longitudinally through turning portion 440, as shown in FIG. 5.

Second section 545 of optical path 505 passes longitudinally through turning portion 440 of continuous block 440 and is perpendicular to the first section 535 of optical path 505. Second face 464 of third prism 460 forms a third TIR surface 465 for directing light from the second prism 450 to second rectangular portion 470, which is substantially parallel to the first rectangular portion 430. Third face 466 of third prism 460 is seamlessly connected to a first end 472 of second rectangular portion 470. The passage of light through third prism 460 may be similar to the passage of light through the first prism 420, with light incident normally on the first face 462 and third face 466, and with light incident on second face 464 at 45 degrees. Thus, third prism 460 turns the optical path 505 through a further 90 degrees onto a third second section 575 of the optical path 505, which is perpendicular to the second section 545 and parallel to the first section 535. Third section 575 of the optical path 505 extends longitudinally through second rectangular portion 470.

Each of the second TIR surface 445 and third TIR surface 465 of turning portion 440 comprises a machined or polished surface of the transparent material of the respective second and third prisms. In addition, seamless connections are provided between the first rectangular portion 430 and the second prism 450, second prism 450 and third prism 460, and third prism 460 and second rectangular portion 470, similar to the above-described seamless connection between first end 432 of first rectangular portion 430 and third face 426 of first prism 420.

Second rectangular portion 470 extends parallel to first rectangular portion 430 on a second side of continuous block 400, wherein the second side of continuous block 400 is opposite to the first side of continuous block 400. Second rectangular portion 470 comprises a continuous rectangular/parallelepiped block of solid transparent material having a first end 472 and a second end 474. The ends of the second rectangular portion 470 are square in shape and the sides that are rectangular or oblong in shape. Second rectangular portion 470 may be a single rectangular block (e.g. parallelepiped) or a modular arrangement of one or more rectangular blocks and prisms. The length of the second rectangular portion 470 is longer than its width and corresponds to the geometric length of the third section 575 of optical path 505. In the illustrated embodiment, the geometric dimensions of second rectangular portion 270 are smaller than those of the first rectangular portion 430, although this is not essential. The choice of dimensions of the portions of the continuous block 400 is discussed below.

Second end 474 of second rectangular portion 470 forms the second end 480 of continuous block 400. Second end 480 of continuous block 400 comprises a fourth prism 490 for coupling light between continuous block 400 and a first spatial light modulator (SLM) on the second side of continuous block 400. A first face 492 of fourth prism 490 is seamlessly optically connected to a second end 474 of second rectangular portion 470. A second face 494 of fourth prism 490 forms a fourth TIR surface 495 for redirecting light from the third section 575 of optical path 505 to the third face 496 of the fourth prism 490 that forms a first optical port 572 to the first SLM. The passage of light through the fourth prism 490 may be similar to the passage of light through the first prism 420, with light incident normally on the first face 492 and third face 496, and with light incident at 45 degrees on second face 494. Thus, TIR surface 495 of fourth prism 490 turns the optical path 505 through 90 degrees towards first optical port 572. In embodiments, the first SLM directly abuts the third face 496/optical port 572 of the fourth prism 490, and is arranged to display holograms when illuminated by (collimated) incident light.

Fourth TIR surface 495 of fourth prism 490 comprises a machined or polished surface of the transparent material thereof. In addition, the seamless connection between the second rectangular portion 470 and the fourth prism 490 is similar to the above-described seamless connection between first end 432 of first rectangular portion 430 and third face 426 of first prism 420.

In some embodiments, the holographic projector is a monochromatic projector comprising a single light source emitting light of a single wavelength, which illuminates a single SLM arranged to display holograms that may be specifically calculated for the particular wavelength. In this case, continuous block 400 is arranged to provide a single channel, corresponding to the first wavelength. Second rectangular portion 470 comprises a single rectangular block (e.g. parallelepiped) of transparent material and fourth prism 490, at the second end 474 thereof, provides the optical port 572 that couples light of the first wavelength between continuous block 400 and first SLM.

In the illustrated embodiment, the holographic projector is a polychromatic (e.g. full-colour) projector comprising one or more light sources emitting light of a plurality of individual wavelengths of light (e.g. three light sources emitting red, green and blue light, respectively), where each wavelength of light illuminates a respective one of a plurality of SLMs (e.g. three SLMs) and each SLM is arranged to display holograms that may be specifically calculated for the particular wavelength. Thus, continuous block 400 is arranged to provide three different colour channels, corresponding to three different wavelengths of light from respective light sources. The three different colour channels are provided through the same continuous block 400. The three colour channels may substantially overlap, as described below. Accordingly, second rectangular portion 470 is formed in a modular arrangement, shown in detail in FIG. 9A. The modular arrangement further comprises a second optical port 574 to a second SLM arranged to display holograms of a second wavelength of light, and a third optical port 576 to a third SLM arranged to display holograms of a third wavelength of light. The second optical port 574 to the second SLM comprises a third face of a first beam-splitting cube 476 and the third optical port 576 to the third SLM comprises a third face of a second beam-splitting cube 478. The first, second and third optical ports 572, 574, 576 to respective first, second and third SLMs are coplanar, such that the SLMs are positioned in a staggered arrangement on the second side of continuous block 400 opposite to the first side having the I/O optical port 412. The second SLM may abut second optical port 574 and the third SLM may abut third optical port 576. Second rectangular portion 470 further comprises a rectangular block 473 (e.g. parallelepiped) between fourth prism 490 and first beam splitting cube 476, and a rectangular block 475 (e.g. parallelepiped) between first beam-splitting cube 476 and second beam-splitting cube 478. The length of each rectangular block is dependent upon design requirements including the wavelength(s) of light of the channels that propagate along the optical path 505 therein and the size of the replay field.

As shown in FIG. 6, each of first and second beam-splitting cubes 476, 478 comprises a pair of prisms of transparent solid material arranged to form a cube by abutting (or otherwise seamlessly optically connecting) their bases. The base of at least one of the prisms may comprise a dielectric layer. In the illustrated embodiments, each of the first and second beam-splitting cubes 476, 478 comprises a dielectric layer that provides a dichroic layer that is configured to reflect light of a selected wavelength, and transmit light of at least one other wavelength. Thus, the beam splitting cube acts as a mirror (only) for light of the selected wavelength. It may be said that the dielectric layer interface of each beam splitting reflects light of the selected wavelength (in both directions), by total internal reflection, and transmits light of non-selected wavelengths. This enables separation of colour channels, as described in European patent 3 268 816B. Thus, the first beam-splitting cube 476 has a dichroic layer to reflect light of the second wavelength (e.g. green) onto the second SLM, and to transmit light of the first wavelength (e.g. blue) along the optical path to the fourth prism 490. Thus, the dichroic layer of the first beam-splitting cube 476 forms a TIR surface for light of the first wavelength, which, like light on the TIR surface 425 of first prism 420, is incident at 45 degrees on the internal interface formed by the abutted prism bases. Similarly, the second beam splitting cube 478 has a dichroic layer to reflect light of the third wavelength (e.g. red) onto the third SLM (i.e. dichroic layer forms a IR surface), and to transmit light of the second and first wavelengths along the third section 475 of the optical path to the first beam splitting cube 476 and the fourth prism 490, respectively. Thus, light reflected by the dichroic layer of each of the first and second beam-splitting cubes is turned through 90 degrees towards the corresponding optical port/SLM.

The modular arrangement of the second rectangular portion 470 of the illustrated embodiments provides flexibility for a holographic projector comprising a plurality of SLMs with corresponding wavelengths. In particular, implementations are not limited to three output ports to SLMs but may comprise, two, four or more than four SLMs according to application requirements.

Double-Pass System

The continuous block 400 of the first embodiment shown in FIGS. 4-6 may be implemented in a double pass optical system, as described below with reference to FIGS. 7 and 8.

Figure 7:
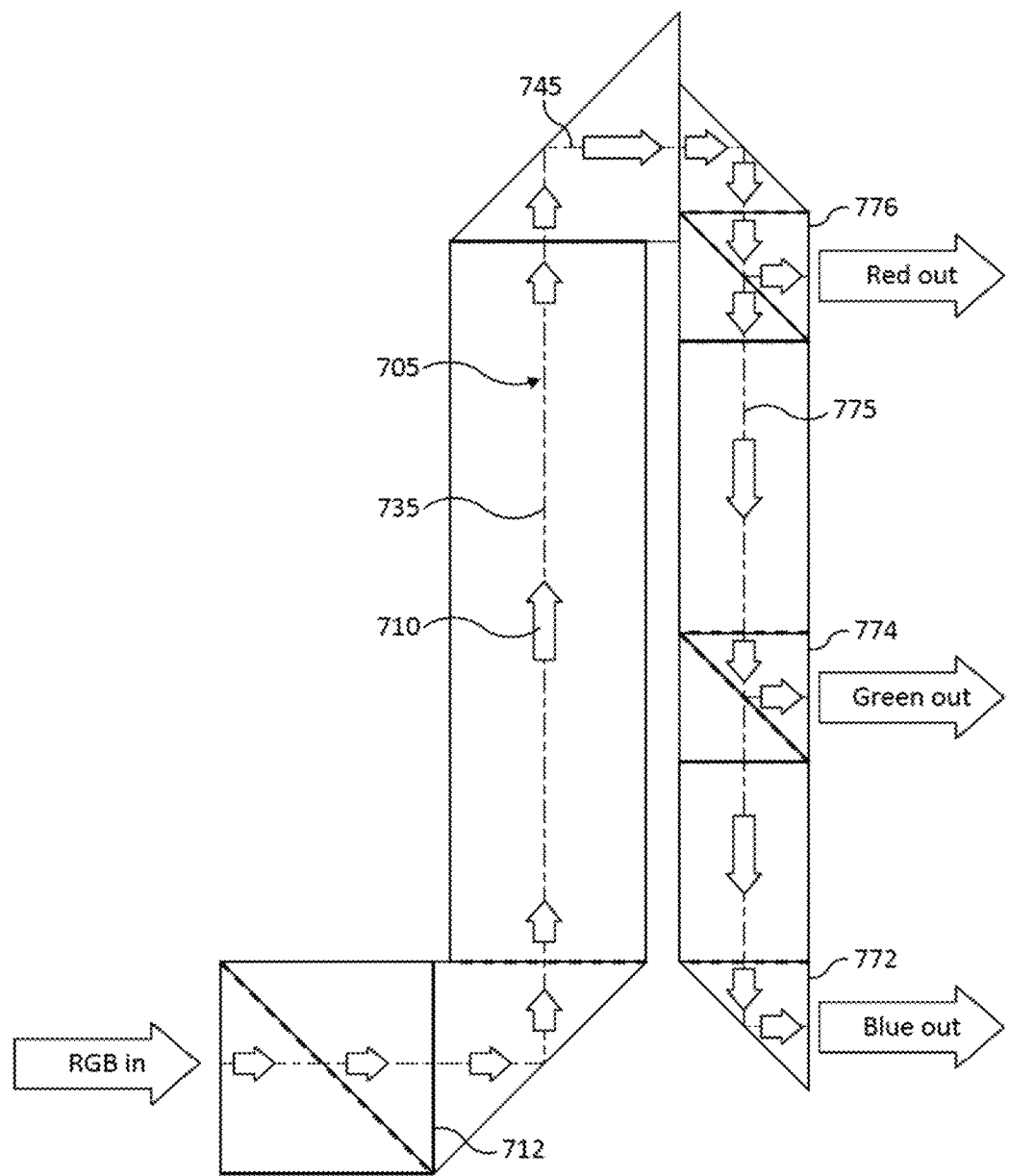
FIG. 7 is a schematic showing a first pass of light through the continuous block of transparent material of FIG. 4, forming an optical path for an input light beam of the holographic projector in accordance with an embodiment.

Referring now to FIG. 7, an input optical path 705 for an input light beam 710 through the continuous block of transparent material 400 to first, second and third SLMs is shown. Input optical path 705 of input light beam 710 forms a "first pass" of the double pass optical system, and forms an "optical axis" of the system. Thus, input optical path 705 is an "illumination path" of the holographic projector, as described above. The input light beam 710 comprises three color channels, corresponding to the first, second and third wavelengths described above, arranged substantially on a common axis (colinear) corresponding to the optical path 705. In the illustrated implementation, the first wavelength corresponds to blue light, the second wavelength corresponds to green light and the third wavelength corresponds to red light.

Input light beam 710 is received from at least one light source (not shown) and is incident normally (i.e. at an angle of incidence of 90°) on the first face 422 of first prism 420, which forms I/O optical port 712, as shown by arrow "RGB in" in FIG. 7. Input light beam 710 propagates into the first prism 410 where it is incident on second face 424, forming the base of the prism 420, at an angle of incidence greater than the critical angle. Accordingly, first TIR surface 425 redirects (i.e. turns) the entire light beam 710, by total internal reflection, to the third face 426 of first prism 420 at an angle of incidence of 90 degrees. Thus, at the third face 426 of first prism 420, light beam 710 passes through the seamlessly-connected first end 432 of the first rectangular portion 430 onto first section 735 of optical path 705. The input light beam 710 propagates longitudinally through the first rectangular portion 430 along the first section 735 of the optical path 705 to the second end 434 of the first rectangular portion 430, where it enters the turning portion 440 comprising second prism 450 and third prism 460.

In particular, input light beam 710 is incident normally on the second end 434 of the first rectangular portion 430 and passes through the seamlessly-connected first face 452 of second prism 450. Thus, light beam 710 propagates into the second prism 450 where it is incident on the second face 454, forming the base of the prism 450, at an angle of incidence greater than the critical angle. Accordingly, second TIR surface 445 redirects the entire light beam 710, by total internal reflection, to the third face 456 of second prism 450 at an angle of incidence of 90 degrees onto second section 745 of optical path 705. Thus, second prism 450 turns the optical path 705 through 90 degrees onto the second section 745, which is perpendicular to first section 735 thereof. From the third face 456 of second prism 450, the light beam 710 passes through the seamlessly-connected first face 462 of third prism 460 and propagates into the third prism 460 where it is incident on the second face 464, forming the base of the prism 460, at an angle of incidence greater than the critical angle. Accordingly, third TIR surface 465 redirects the entire light beam 710, by total internal reflection, to the third face 466 of third prism 460 at an angle of incidence of 90 degrees onto third section 775 of optical path 705, which is parallel to the first section 735 of optical path 705. Thus, third prism 460 turns the optical path 705 through a further 90 degrees. Accordingly, turning portion 440 turns the optical path 705 through a total of 180 degrees. Thus, optical path 505 is "folded" to minimise the physical volume of the holographic projector, as described above.

From the third face 466 of third prism 460, the light beam 7510 passes normally the seamlessly-connected first end 472 of second rectangular portion 470, propagates longitudinally through the second rectangular portion 470 along the third section 575 of optical path 705 and is output from a respective one of a plurality of optical ports 772, 774, 776 in the second rectangular portion 470, according to wavelength of light. The optical ports are provided for respective colour channels and formed in a staggered arrangement along the length of the second rectangular portion 470 to provide channels having optical paths of different geometric lengths.

In particular, the second rectangular portion 470 comprises three optical ports 772, 774, 776, through which output light passes in a direction at 90 degrees to the third section 775 of optical path 705 onto a respective SLM. At the first end 472 of second rectangular portion 470, second beam-splitting cube 478 redirects (turns through 90 degrees) light of the third wavelength (e.g. red), by total internal reflection, to third optical port 776 so that light of the third wavelength is incident on third SLM (as shown by arrow "Red out" in FIG. 7). Light of the first and second wavelengths (e.g. blue and green) is transmitted normally and continues to propagate longitudinally through second rectangular portion 470 along third section 775 of optical path 7505 until it reaches first beam splitting cube 476. First beam splitting cube 476 redirects (turns through 90 degrees) light of the second wavelength (e.g. green), by total internal reflection, to second optical port 774 so that light of the second wavelength is incident on second SLM (as shown by arrow "Green out" in FIG. 7). Light of the first wavelength (blue) is transmitted normally and continues to propagate longitudinally through second rectangular portion 470 along third section 775 of optical path 705 until it reaches the second end 474 of second rectangular portion 470 and fourth prism 490. At the fourth prism 490, the entire light beam 710 (i.e. the remaining light of the first wavelength) is redirected (turned through 90 degrees) by fourth TIR surface 495, by total internal reflection, to first optical port 772 so that light of the first wavelength in incident on the first SLM (as shown by arrow "Blue out" in FIG. 7).

In implementations comprising a single pass optical system, the SLMs may be transmissive or reflective of light from the respective optical port, and spatially modulated light may be output along a projection path that is different from the optical path 705 of the input light beam 710 (e.g. external to continuous block 400)

In implementations comprising a double pass optical system, light from the respective first, second and third optical ports 772, 774, 776 may be incident on the respective first, second and third SLMs at an angle of incidence of 90° (i.e. normal to the surface of the SLM), and each SLM is a reflective SLM. Thus, spatially modulated light from each SLM is returned along the same optical path 705 as the input light beam 710, but in the opposite direction, as described below with reference to FIG. 8.

In some implementations, each optical port 772, 774, 776 may be a flat surface, which the respective SLM directly abuts. Optical alignment of the SLM is crucial for forming a good quality holographic reconstruction. Thus, each optical port may comprise a surface machined to high precision so as to provide an excellent surface onto which the spatial light modulator can be mounted. Typically, the input light beam 710 comprises collimated light; for example, a collimating lens may be provided between the light source and the first end 410 of the continuous block 400.

In other implementations, each optical port 772, 774, 776 comprises a shaped surface arranged to provide optical power such that the light incident upon the respective SLM is collimated. It can be advantageous for the input light beam 710 to be diverging. However, it can be preferable to illuminate an SLM (e.g. a phase-based SLM such as LCOS SLM) with collimated light. In some embodiments, the optical port coupled to the SLM is shaped—e.g. curved in a dome shape—to provide optical power/lensing so as collimate the diverging light. In particular, the shaped surface of the optical port is configured to provide the required optical power to collimate the input light beam 710. The skilled person will understand that the required optical power may be determined based on the angle of divergence of the input light beam 710. An example of an optical port configured to provide optical power is described below with reference to FIG. 9B.

Figure 8:
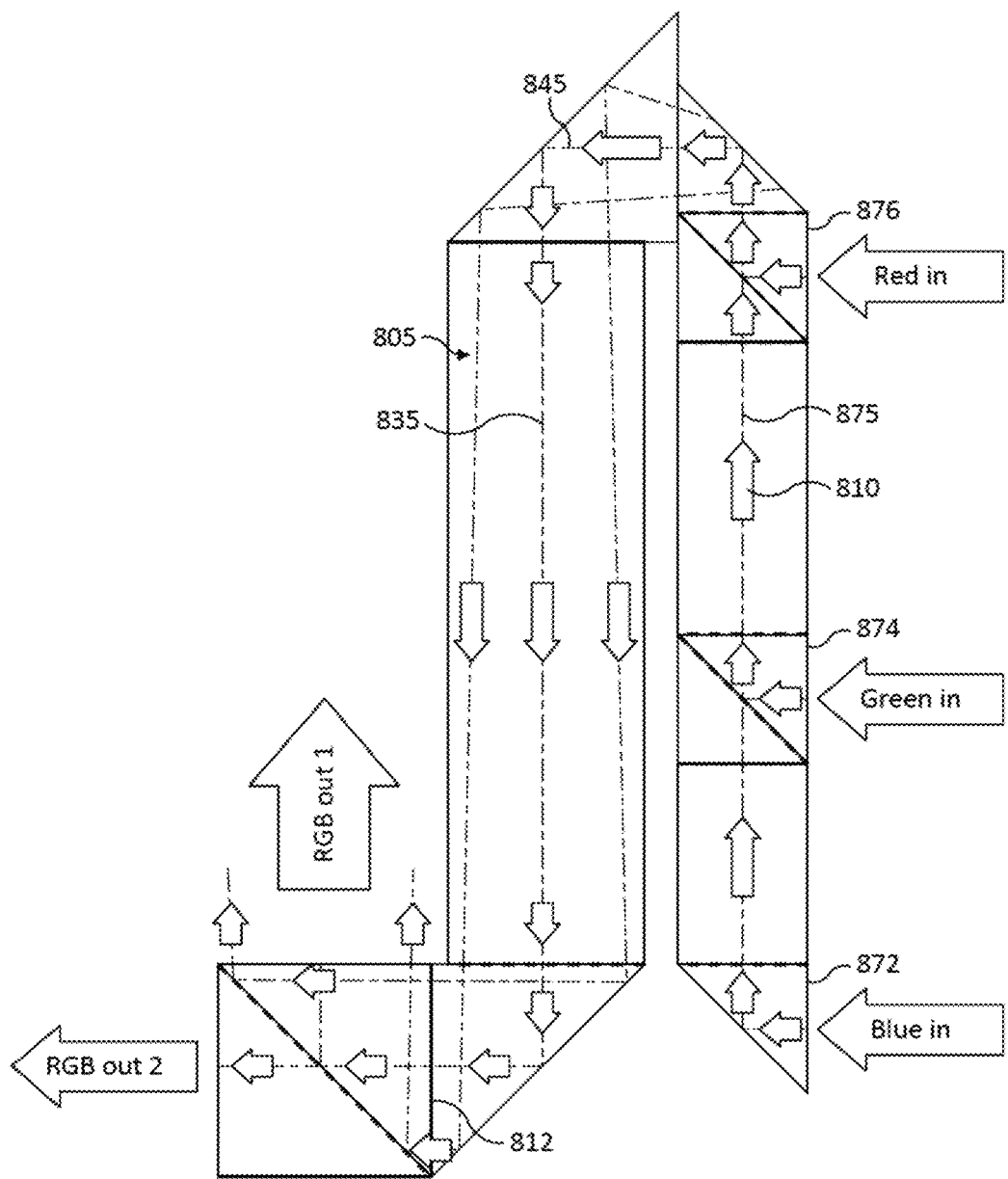
FIG. 8 is a schematic showing a second pass of light through the continuous block of transparent material of FIG. 4, forming an optical path for an output light beam of the holographic projector in accordance with an embodiment.

Referring now to FIG. 8, an output optical path 805 for an output light beam 810 through the continuous block of transparent material 400 from first, second and third SLMs through respective first, second and third optical ports 872, 874, 876, is shown. The output optical path 805 of output light beam 810 forms a "second pass" of a double pass optical system, and forms a projection axis of the system. Thus, output optical path 805 is a "projection path" of the holographic projector, as described above. The output light beam 810 is spatially modulated light of the first, second and third wavelengths from the respective first, second and third SLMs for holographic reconstruction at a common replay plane. The output optical path 805 is coincident (colinear) with the input optical path 705 shown in FIG. 7, and the input 710 and output 810 light beams are separated by an I/O beam splitting cube, as described further below.

Spatially modulated light of the first wavelength from first SLM is received through corresponding optical port 872 and redirected (turned through 90 degrees) by TIR surface 495 of fourth prism 490 onto a first section 875 of output optical path 805 through second rectangular portion 470 of continuous block 400. First section 875 of optical path 805 is coincident with third section 875 of input optical path 805, but extends in the opposite direction. Thus, first section 875 of optical path 805 extends longitudinally through second rectangular portion 470 from second end 474 through block 473 towards first end 472 thereof. At first beam splitting cube 476, spatially modulated light of the second wavelength from second SLM is received through corresponding optical port 874, and redirected (turned through 90 degrees) by TIR surface/dichroic layer thereof onto the first section 875 of output optical path 805. Spatially modulated light of the first wavelength from first SLM propagates normally through first beam-splitting cube 476. Thus, spatially modulated light of the first and second wavelengths propagate longitudinally along first section 875 of output optical path 805 through block 475 of second rectangular portion 470. At the second beam-splitting cube 478, spatially modulated light of the third wavelength from third SLM is received through corresponding optical port 872, and is redirected (turned through 90 degrees) by TIR surface/dichroic layer of second beam-splitting cube 478 along the remainder of first section 875 of optical path 805. Spatially modulated light of the first and second wavelengths from respective first and second SLM propagates normally through second beam-splitting cube 478. The spatially modulated light comprising the combined first, second and third wavelengths propagates longitudinally along the remainder of first section 875 of optical path 805 until it reaches the second end 472 of the second rectangular portion 470.

The optical path 805 of the combined spatially modulated light of the first, second and third wavelengths forming the output light beam 810 is then turned through 90° by third prism 460 of turning portion 440 onto second section 845 of output optical path 805, which is coincident with second section 745 of input optical path 705 but extends in the opposite direction. Similarly, the output optical path 805 is then turned through 90° by second prism 850 of turning portion 440 onto third section 835 of output optical path 805, which is coincident with first section 735 of input optical path 705 but extends in the opposite direction. Thus, the turning portion 440 of the continuous block 400 turns the output optical path 805 through 180°. The output light beam 810 then propagates longitudinally through first rectangular portion 430 from second end 434 to first end 432 thereof, along third section 835 of output optical path 805. In implementations, the output light beam 810 comprises spatially modulated light having an angle of diffraction, due to the pixels array forming the SLM (e.g., LCOS SLM). As a result of the diffraction angle, output light beam 810 is slightly diverging, and turning portion 440 may widen the diverging light beam 810, as shown by dot-dashed lines in FIG. 8. Accordingly, first rectangular portion 430 of continuous block 440 is wider that second rectangular portion 470 so that the output light beam 810 propagates along third section 835 of output optical path 805 entirely within the transparent material thereof.

The output light beam 810 is incident at an angle of 90 degrees at the first end 432 of the first rectangular portion 430, and so passes through the seamlessly-connected third face 426 of first prism 420, is reflected by TIR surface 425, by total internal reflection, to first face 422 of first prism 420 and out of the continuous block 400. Thus, TIR surface 425 of first prism 420 turns the output light beam 810 through 90 degrees to I/O optical port 812 formed in first face 422.

A third beam-splitting cube 415, which forms an I/O beam splitting cube 415, is seamlessly optically connected to first face 422 of first prism 420 to separate the input light beam 710 from the output light beam 810. As described above, I/O beam splitting cube 415 forms a one way mirror, which reflects the output light beam 810, by total internal reflection, but transmits the input light beam 710.

In particular, I/O beam-splitting cube 415 comprises an input port 415A and an output port 415B on respective faces arranged at 90 degrees to each other. The output port 415B directs the output light beam 810, as indicated by the arrow "RGB out 1" in FIG. 8, to a replay plane for a holographic reconstruction of the spatially modulated light from the SLMs. For example, a diffuser (not shown) may be provided at the replay plane on the first side of continuous block 400 adjacent first rectangular portion 430. Accordingly, the output light beam 810 may pass along a projection path through air between output port 415B and the replay plane. The input port 415A receives light from at least one light source at a normal angle of incidence, as indicated by "RGB in" arrow in FIG. 7. The light source may be adjoined to input port 415A or spaced therefrom by air. Thus, at least part of the optical path 505 of the holographic projector may be through air.

The geometric length of the output optical path 805 for each of the first, second and third colour channels of the output light beam 810 are different to compensate for the dependence of replay field size on wavelength, as described in European patent 3,268,816. Specifically, the lengths of the single colour channels are individually determined such that the size of each replay field on the replay plane is the same. This is achieved by the staggered arrangement of the optical ports 772, 774, 776 associated with the respective first, second and third SLMs, as described above.

Figure 12A:
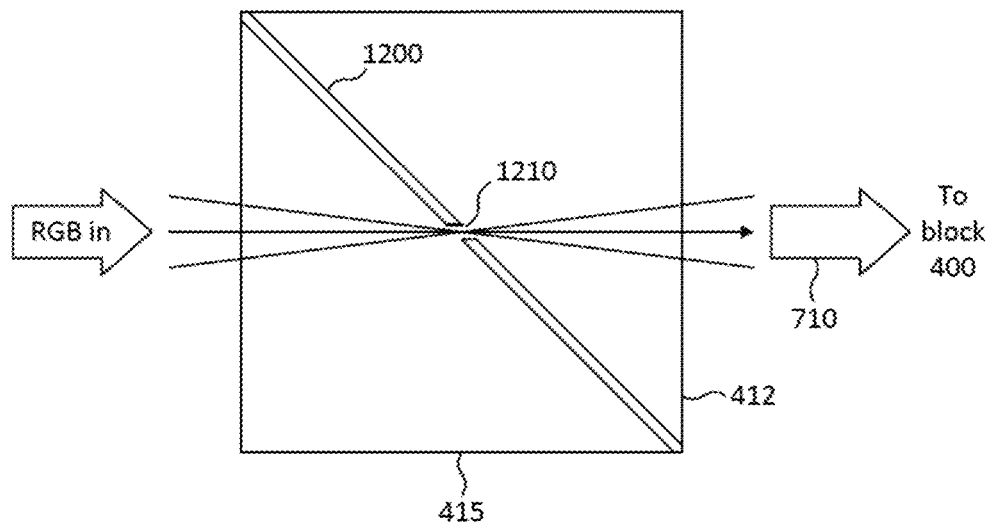
FIGS. 12A and 12B are schematics showing the use of a beam splitting cube arrangement, for separating an input beam from an output beam, in a holographic projector in accordance with an embodiment.
Figure 12B:
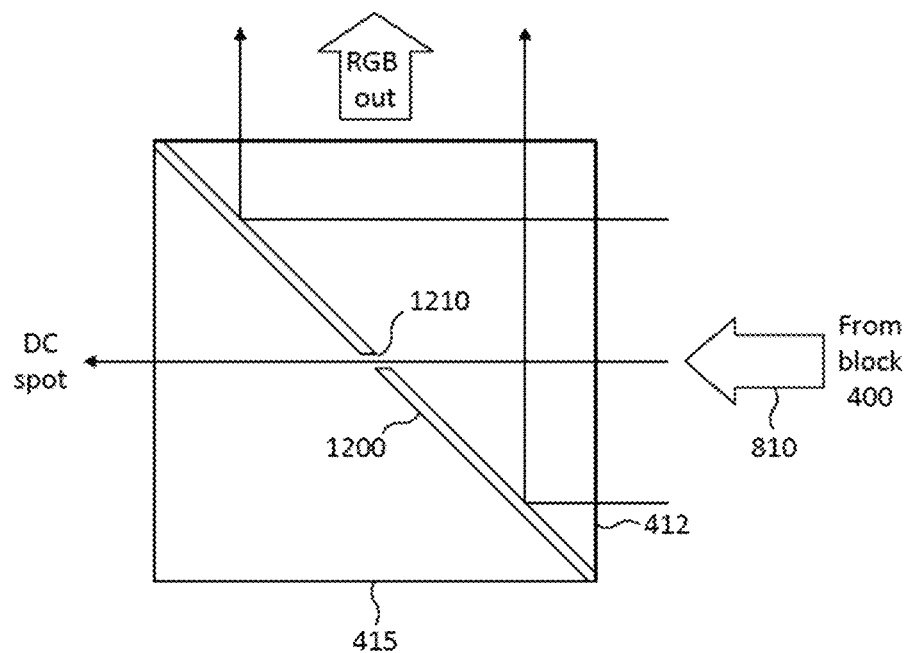

In an embodiment, the internal interface 1200 of I/O beam-splitting cube 415, formed by the abutting bases of the pair of prisms thereof, comprises a pinhole aperture 1210 as shown in FIGS. 12A and 12B. Referring to FIG. 12A, light from a light source (not shown) forming the input light beam 710 may form a spot on the internal interface 1200 coincident with, and substantially the same size as, the pinhole aperture 1210, so that the light propagates through the I/O optical port 412 into continuous block 400. For example, a lens (not shown) may be used between a laser light source and the I/O beam-splitting cube 415 to focus the light spot on the pinhole aperture 1210. Thus, in this embodiment, the input light beam 710 converges before the pinhole aperture 1210 and diverges 1210 after the pinhole aperture. Thus, pinhole aperture 1210 is arranged to transmit diverging light of the light source received through the input port 415A into continuous block 400. A collimating element may be used before the input light beam 710 is incident on the or each SLM, for example by using a shaped optical port (e.g. a dome shaped port to provide optical power for collimating the beam, as described above and shown in FIG. 9B). Referring to FIG. 12B, the output light beam 810 is a diffracted beam, typically having an angle of diffraction and is therefore also diverging. Thus, output light beam 810 from continuous block 400 passes through I/O optical port 412 as a relatively wide beam that extends across the internal interface 1200 of I/O beam splitting cube 415. However, the internal interface 1200 of the third beam-splitting cube 415 functions as a TIR surface to the output light beam 810 (i.e. one-way mirror) that reflects substantially the entire output light beam 810 to the output port 415B, as indicated by arrow "RGB out 1" in FIG. 8. In particular, only a very small part of the output light beam 810 is transmitted through the pinhole aperture 1210 to the input port 415A, as indicated by arrow "RGB out 2" in FIG. 8. In fact, the pinhole aperture 1200 may operate to effectively remove the so-called "DC spot" (corresponding to "zero-order" or undiffracted light) from the holographic replay field. This improves the signal to noise ratio of the holographic reconstruction because the DC spot is not image content but noise. The I/O beam-splitting cube 415 is therefore a simple means for separating the input and output beams 710, 810, and optionally removing noise, without introducing optical losses associated with the image content.

Significantly, the lateral dimensions (i.e. cross section) of the continuous block 400 enable input light beam 710 and output light beam 810 to propagate longitudinally through the portions 430, 440, 470 of continuous block 400, and so entirely within the transparent material thereof. Significantly, there are no internal reflections from the sidewalls of the continuous block 400; the only internal reflections are by the TIR surfaces of prisms and beam-splitting cubes for changing the direction (i.e. route) of the optical path, as described herein. This is the case even where the input light beam 710 and/or the output light beam 810 is diverging. It may be said that the cross section of the continuous block 400 is sufficient to accommodate the input light beam 710 and the diverging output light beam 810, even with beam divergence. In practice, it is desirable to minimise the volume of the continuous block 400, so that the rays/ray bundles of the input light beam 710 and output light beam 810 are just contained within the optically transparent material. This minimises the size and weight of the holographic projector. In operation, the optical axis (or illumination path) of the input light beam 710 and the projection axis (or propagation path) of the output light beam 810 are aligned to be substantially coincident with the longitudinal axis (i.e. through the centre) of the continuous block 400. This is achieved by aligning the light source with the continuous block 400 so that the input light beam 710 is incident normally on the face of the input port. In addition, the centre of the input light beam 710 may be aligned with the centre of the face of the input port, although this is not essential. In this way, that the input light beam 710 propagates longitudinally through the continuous block 400 along the optical axis (optical path 505). In addition, the input light beam 710 has a sufficiently small cross section so that the ray bundles thereof avoid impinging on the sides of continuous block 400, even with slight beam divergence. Similarly, in double-pass implementations, the or each SLM is aligned with the continuous block 400 so that the output spatially modulated light is incident normally on the face of the respective optical port. In this way, the typically diverging output light beam 810 propagates longitudinally through continuous block 400 along the projection axis without impinging on the sides of continuous block 400. Thus, the full ray bundle associated with the input light beam 710 and the full ray bundle associated with the output light beam 810 propagate entirely within the transparent material. It may be said that the cross section of continuous block 400 is greater than a cross section of the input/output light beam 710, 810 at all points along the optical path 505. In addition, the continuous block 400 is configured to define the route and length of the optical path 505 for the input light beam 710 and output light beam 810. In particular, the route is determined by the location and configuration of TIR surfaces of prisms and beam-splitting cubes within continuous block 400, as described herein. Whilst in the illustrated embodiment, the TIR surfaces are at 45 degrees to the optical path 505, other angles are possible. Indeed, the configuration and dimensions of the blocks and prisms forming the continuous block 400 may be chosen to achieve any desired route for the optical path 505. For instance, additional optical folds in the optical path 505 may be provided using additional turning portions comprising prism pairs, as described herein.

Other Embodiments

Figure 9A:
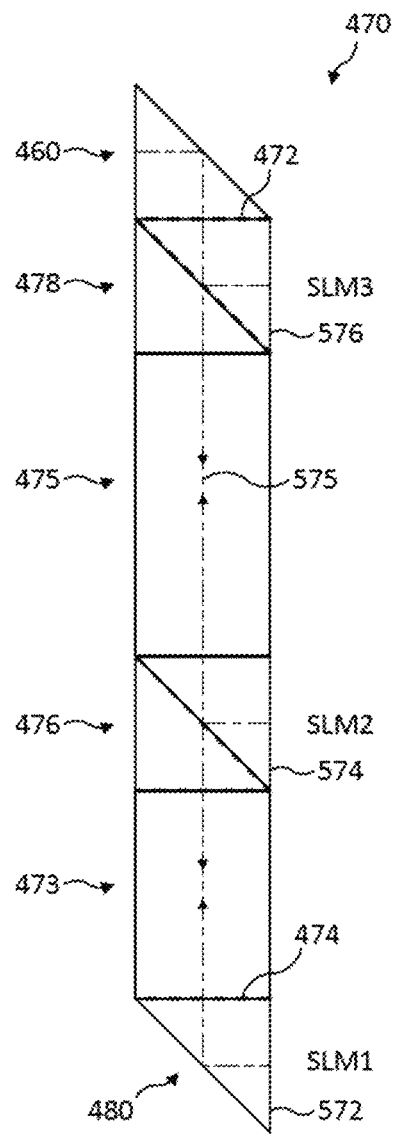
FIG. 9A is a schematic plan view of a continuous block of transparent material in accordance with another embodiment.

FIG. 9A shows a continuous block of transparent material, corresponding to the second rectangular portion 470 of the embodiment of FIGS. 4-8, which may be used independently to form at least a part of an optical path 575 of a holographic projector. As described above, the continuous block 470 comprises prisms 160 and 480 at respective ends thereof, and first and second beam splitting cubes 476, 478 separated by rectangular blocks (i.e. parallelepipeds) 473 and 475. Prism 460 is arranged with an I/O optical port facing a first side of the continuous block (left hand side in FIG. 9A). Prism 480 and first and second beam splitting cubes 476, 478 are arranged with respective optical ports 572, 574, 576 facing a second side of the continuous block 470 (right hand side in FIG. 9A) to respective first, second and third SLMs. Thus, the continuous block 470 provides a double pass optical path 575, whereby an input light beam enters I/O optical port and travels along the optical path 575 in one direction to the SLMs, and spatially modulated light from the SLMs travels along the optical path 575 in the opposite direction to the I/O optical port. The optical path 575 through the transparent material of the continuous block 470 of FIG. 9A may comprise substantially the whole of the optical path of the holographic projector, or just a part of the optical path of the projector—the remainder of the optical path passing through free space.

Figure 9B:
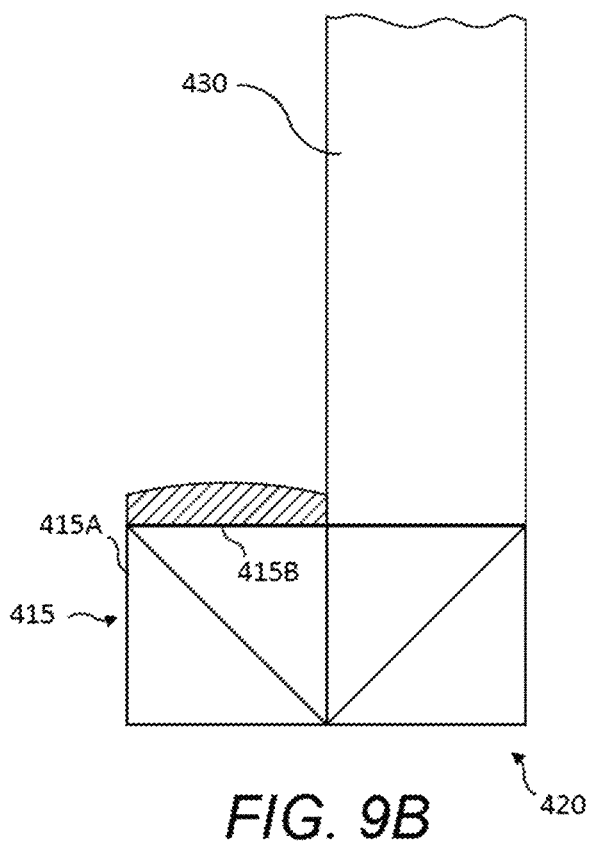
FIG. 9B is a schematic plan view of an optical port, having optical power, in accordance with an embodiment.

FIG. 9B shows a specially shaped optical port. The optical port shown in FIG. 9B is the output port 415B coupled to the replay plane. However, the same structure may be used for one or more of optical ports 572, 574, 576, to an SLM. In particular, the optical port is dome shaped, and thus has optical power. In particular, a lens of the same transparent material may be seamlessly connected to the face of the prism or beam splitting cube defining the optical port to an SLM. Alternatively, the lens may be integrally formed (e.g. by shaping the surface of the optical port in a dome shape). The lens has optical power. The optical power provides collimation to diverging or otherwise uncollimated light output through the optical port from the continuous block (e.g. prism 480 or beam splitting cube 476, 478) to the SLM. The skilled artesian will understand that any number of different methods may be used to fix the planar surface of an SLM to a dome-shaped optical port.

FIG. 10 shows a continuous block of transparent material 1000 arranged to form at least part of an optical path 1005 of a holographic projector in accordance with another embodiment.

Similar to the embodiment of FIG. 9A, the embodiment of FIG. 10 comprises a double pass optical system, but otherwise differs from the embodiment of FIG. 4-8 in several respects. In particular, the optical path 1005 is not folded and the continuous block 1000 provides a single channel for the propagation of light of a single (first) wavelength along the optical path 1005 to and from a single (first) SLM. The optical path 1005 through the transparent material of the continuous block 1000 of FIG. 10 may comprise substantially the whole of the optical path of the holographic projector, or just a part of the optical path of the projector—the remainder of the optical path passing through free space.

In particular, continuous block 1000 has a first prism 1020, a rectangular portion 1030 and a second prism 1040, which are optically connected in a seamless manner, and are formed from the same transparent solid material as described above. Thus, a continuous block 1000 is provided for the propagation of light on an optical path 1005 of the holographic projector. Optical path 1005 extends longitudinally through the transparent material of the continuous block 1000, as described herein.

First prism 1020 couples an input light beam of a first wavelength from a light source (not shown) into the continuous block 1000 through I/O optical port 1012. Similarly, first prism 1020 couples an output light beam comprising spatially modulated light of the first wavelength from the first SLM out of the continuous block 1000 through I/O optical port 1012. Thus, first prism 1020 is equivalent to the first prism 420 of the embodiment of FIGS. 4-8. Accordingly, input light beam from the light source propagates normally through a first face 1022 of the first prism 1020 (i.e. I/O optical port 1012), where it is incident at 45 degrees on a second face 1024 (forming an interface with air) and is reflected, by total internal reflection, to be incident normally a third face 1026 of first prism 1020 along optical path 1005. Third face 1026 is seamlessly optically connected to a first end 1032 of rectangular portion 1030. Similarly, rectangular portion 1030 comprises a rectangular block (e.g. parallelepiped) equivalent to the first rectangular portion 430 of the embodiment of FIGS. 4-8. Optical path 1005 for the input light beam extends longitudinally through rectangular portion 1030 from the first end 1032 to a second end 1034 thereof, which is seamlessly optically connected to a first face 1042 of second prism 1040. Second prism 1040 is equivalent to the fourth prism 490 of the embodiment of FIGS. 4-8. Thus, the input light beam from the rectangular portion 1030 propagates normally through a first face 1042 of the second prism 1040, where it is incident at 45 degrees on a second face 1044 (forming an interface with air) and is reflected, by total internal reflection, to be incident normally onto a third face 1046 of the second prism 1040. Third face 1046 provides an optical port to first SLM, which may be configured as described above.

As indicated above, the embodiment of FIG. 10 is a double pass optical system. Thus, spatially modulated light of the first wavelength is received through the optical port formed by the third face 1046 of the second prism 1040 as an output light beam. Output light beam propagates along a projection path corresponding to the optical path 1005 for the input light beam but in the opposite direction. Thus, the output light beam propagates longitudinally through continuous block 1000 comprising second prism 1040, rectangular portion 1030 and first prism 1020, as described herein, and is output through first face 1022 of first prism 1020 to a replay plane.

FIG. 11 shows a continuous block of transparent material 1100 arranged to form at least part of an optical path 1105 of a holographic projector in accordance with another embodiment.

The embodiment of FIG. 11 is substantially the same as the embodiment of FIG. 10, and so is not described in detail herein. The continuous block 1100 of FIG. 11 further comprises an I/O beam-splitting cube 1015 at the I/O optical port 1112 of the first prism 1120. In particular, I/O beam-splitting cube 1015 is seamlessly optically connected to the first face 1022 of first prism 1020, and is arranged to separate the input and output light beams. Thus, I/O beam splitting cube 1015 is equivalent to I/O beam-splitting cube 415 of the embodiment of FIGS. 4-8, as described above. I/O beam splitting cube 1015 may have a pinhole aperture as described above and shown in FIGS. 12A and 12B.

In the above described embodiments, the outer surface of the continuous block of transparent material may be diffuse, so as to scatter light from the surrounding environment such as infrared light from the sun or other light sources. For example, the external surfaces of the continuous block may be roughened or otherwise configured to scatter light incident thereon and thereby prevent extraneous light from entering the continuous block. In addition, or alternatively, the outer surface of the continuous block may be coated to absorb light from the surrounding environment, such as infrared light from the sun or other light sources, thereby preventing such light from entering the continuous block.

The holographic projector may be incorporated in a picture generating unit and/or head-up display for a vehicle.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, a light receiving surface such as a diffuser surface or screen such as a movable diffuser is provided within the holographic projector at the replay plane. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. As described herein, such zero-order light can be regarded as "noise" and includes for example specularly reflected light, and other unwanted light from the SLM.

In the example of Fourier holography, this "noise" is focussed at the focal point of the Fourier lens leading to a bright spot, called the "DC spot", at the centre of the holographic reconstruction. As described herein, the DC spot may be removed from the holographic reconstruction by using a pinhole aperture in the internal interface of a beam-splitting cube used to separate the input beam from the output beam. Thus, the quality of the holographic reconstruction is not adversely affected.

In embodiments, the output light beam that travels through the continuous block of transparent material along the optical path (projection path) comprises only the primary diffraction order of the spatially modulated light output by the respective SLM for holographic reconstruction of the primary order replay field (i.e. primary order holographic reconstruction) at the replay plane.

In embodiments, the holographic reconstruction is colour as illustrated in FIGS. 7 and 8. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A holographic projector having an optical path, wherein the holographic projector comprises:
    a first spatial light modulator arranged to display a first hologram;
    a first light source arranged to illuminate the first spatial light modulator with light of a first wavelength such that a first holographic reconstruction corresponding to the first hologram is formed on a replay plane; and
    a continuous block of transparent material, having a refractive index greater than air, which forms at least part of the optical path of the projector, wherein the continuous block comprises at least one parallelepiped block of the transparent material arranged such that light of the projector travels longitudinally through the parallelepiped block without internal reflection from the sides thereof and at least one prism arranged such that light of the projector travels through the prism with one total internal reflection, wherein the at least one prism comprises a first prism including an input/output port and a second prism including a first optical port coupled to the first spatial light modulator.

2. A holographic projector as claimed in claim 1 wherein the at least one prism comprises a surface arranged to reflect light travelling through the prism by total internal reflection so as to change the direction of the light travelling along the optical path.

3. A holographic projector as claimed in claim 2, wherein the surface of a prism providing total internal reflection is a surface having an interface with air.

4. A holographic projector as claimed in claim 1 wherein the continuous block comprises a plurality of parallelepiped blocks of the transparent material and/or a plurality of prisms of the transparent material.

5. A holographic projector as claimed in claim 1 wherein the at least part of the optical path formed through the continuous block of transparent material is at least 25% of the length of the optical path of the holographic projector.

6. A holographic projector as claimed in claim 1, wherein the at least part of the optical path formed through the continuous block of transparent material is at least 75% of the length of the optical path of the holographic projector.

7. A holographic projector as claimed claim 1 wherein the optical path of the holographic projector comprises: an illumination path for light of the projector from the first light source to the first spatial light modulator; and a projection path for the light of the projector from the first spatial light modulator that forms the first holographic projection on the replay plane, wherein the optical axis of the illumination path and the projection axis of the projection path are substantially colinear, and wherein the illumination path and the projection path are opposite in direction.

8. A holographic projector as claimed in claim 1 wherein:
the first spatial light modulator abuts the first optical port, or
the first optical port comprises a shaped surface arranged to provide optical power such that the light incident upon the spatial light modulator is collimated.

9. A holographic projector as claimed in claim 1 further comprising:
a second spatial light modulator arranged to display a second hologram; and
a second light source arranged to illuminate the second spatial light modulator with light of a second wavelength such that a second holographic reconstruction corresponding to the second hologram is formed on the replay plane,
wherein the continuous block comprises a second optical port coupled to the second spatial light modulator.

10. A holographic projector as claimed in claim 9, wherein the second spatial light modulator abuts the second optical port and the distance from the first light source to first spatial light modulator is greater than the distance from the second light source to the second spatial light modulator.

11. A holographic projector as claimed in claim 10 comprising a turning portion including a pair of prisms, wherein the bases of the prisms form the two surfaces and wherein each prism turns the optical path through 90 degrees by total internal reflection.

12. A holographic projector as claimed in claim 9 wherein the continuous block comprises a first beam-splitting cube having a first face arranged to receive spatially-modulated light from the first spatial light modulator, a second face forming the second optical port and a third face, opposite the first face, arranged to receive light from the first and second light sources.

13. A holographic projector as claimed in claim 12 wherein the first beam-splitting cube comprises an internal interface having a dichroic coating which is transmissive at the first wavelength and reflective at the second wavelength.

14. A holographic projector as claimed in claim 1 wherein the continuous block comprises two surfaces collectively arranged to turn the optical path of the holographic projector through 180 degrees, by total internal reflection, such that a folded optical path comprising two parallel sections is formed.

15. A holographic projector as claimed in claim 1 wherein the continuous block comprises a beam-splitting cube optically seamlessly connected to the first prism, the beam splitting cube for separating an input light beam from an output light beam having: a first face forming an input optical port coupled to the first light source; a second face arranged to receive spatially-modulated light; a third face forming an output optical port arranged to output the spatially-modulated light.

16. A holographic projector as claimed in claim 15 wherein the internal interface of the beam-splitting cube for separating an input light beam from an output light beam comprises a pinhole aperture arranged to transmit diverging light of the first light source.

17. A holographic projector as claimed in claim 1 wherein the transparent material has a refractive index greater than 1.4, and/or wherein the transparent material is glass or fused silica.

18. A holographic projector as claimed in claim 1 wherein the optical path extends substantially longitudinally through the centre of the at least one parallelepiped block of transparent material from a first end to a second end, and wherein a cross section of the continuous block is greater than a cross section of the propagating light beam such that light propagates entirely within the transparent material.

19. A method for projecting a holographic image, the method comprising:
displaying a first hologram on a first spatial light modulator arranged to display a first hologram;
illuminating, using a first light source, the first spatial light modulator with light of a first wavelength such that a first holographic reconstruction corresponding to the first hologram is formed on a replay plane; and
wherein light of the first wavelength travels longitudinally through a parallelepiped block without internal reflection from the sides thereof and at least one prism arranged such that light of the projector travels through the prism with one total internal reflection, the parallelepiped block being part of a continuous block of transparent material having a refractive index greater than air, wherein the at least one prism comprises a first prism including an input/output port and a second prism including a first optical port coupled to the first spatial light modulator.

* * * * *